United States Patent [19]

Saar et al.

[11] 4,388,582
[45] Jun. 14, 1983

[54] APPARATUS AND METHOD FOR CHARGING BATTERIES

[75] Inventors: David A. Saar, Timonium; Richard T. Walter, Baltimore; John L. Bowman, Jr., Towson, all of Md.

[73] Assignee: Black & Decker Inc., Newark, Del.

[21] Appl. No.: 337,296

[22] Filed: Jan. 5, 1982

Related U.S. Application Data

[63] Continuation of Ser. No. 911,268, May 31, 1978, abandoned.

[51] Int. Cl.³ .......................... H02J 7/04; H03K 5/00
[52] U.S. Cl. ....................................... 320/20; 320/39; 328/132
[58] Field of Search .............................. 320/20, 22–24, 320/39, 40, 46; 328/132

[56] References Cited

U.S. PATENT DOCUMENTS

| | | |
|---|---|---|
| 3,590,229 | 6/1971 | Humphreys . |
| 3,660,748 | 5/1972 | Clayton . |
| 3,890,556 | 6/1975 | Melling et al. . |
| 3,936,718 | 2/1976 | Melling et al. . |
| 4,114,083 | 9/1978 | Benham et al. ........................ 320/39 |
| 4,118,661 | 10/1978 | Siekierski et al. ..................... 320/40 |

FOREIGN PATENT DOCUMENTS 1438002 10/1968 Fed. Rep. of Germany ........ 320/46

Primary Examiner—William M. Shoop
Attorney, Agent, or Firm—Ronald B. Sherer; Harold Weinstein

[57] ABSTRACT

A method and apparatus are presented for charging batteries at a high rate without damaging or reducing the life of the battery. The method comprises monitoring the level of energy stored in the battery, preferably by monitoring a particular battery characteristic. The variation of the characteristic with time is analyzed, preferably by measuring successive values of the characteristic, computing the slope and comparing successive slope values so as to identify inflection points and other significant events in the variation of the characteristic.

Apparatus for performing these methods and for controlling the supply of energy is disclosed which comprises suitable power supply and a programed microcomputer for measuring successive values of the characteristic, performing the required computations, and controlling the supply of energy applied to the battery by the power supply.

24 Claims, 14 Drawing Figures

NICKEL-CADMIUM BATTERY CHARGING CYCLE

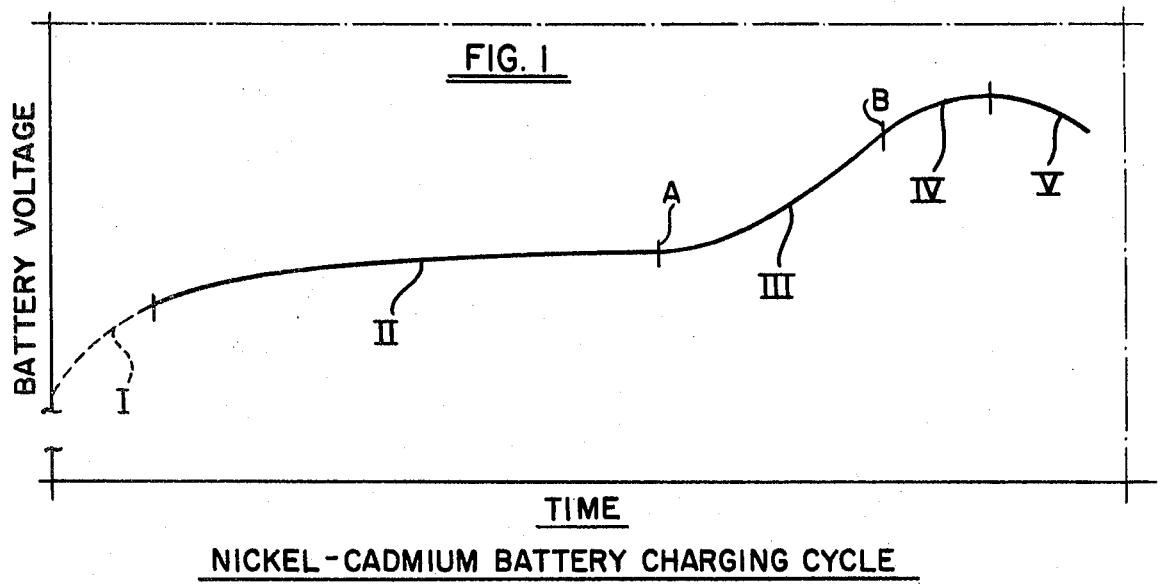
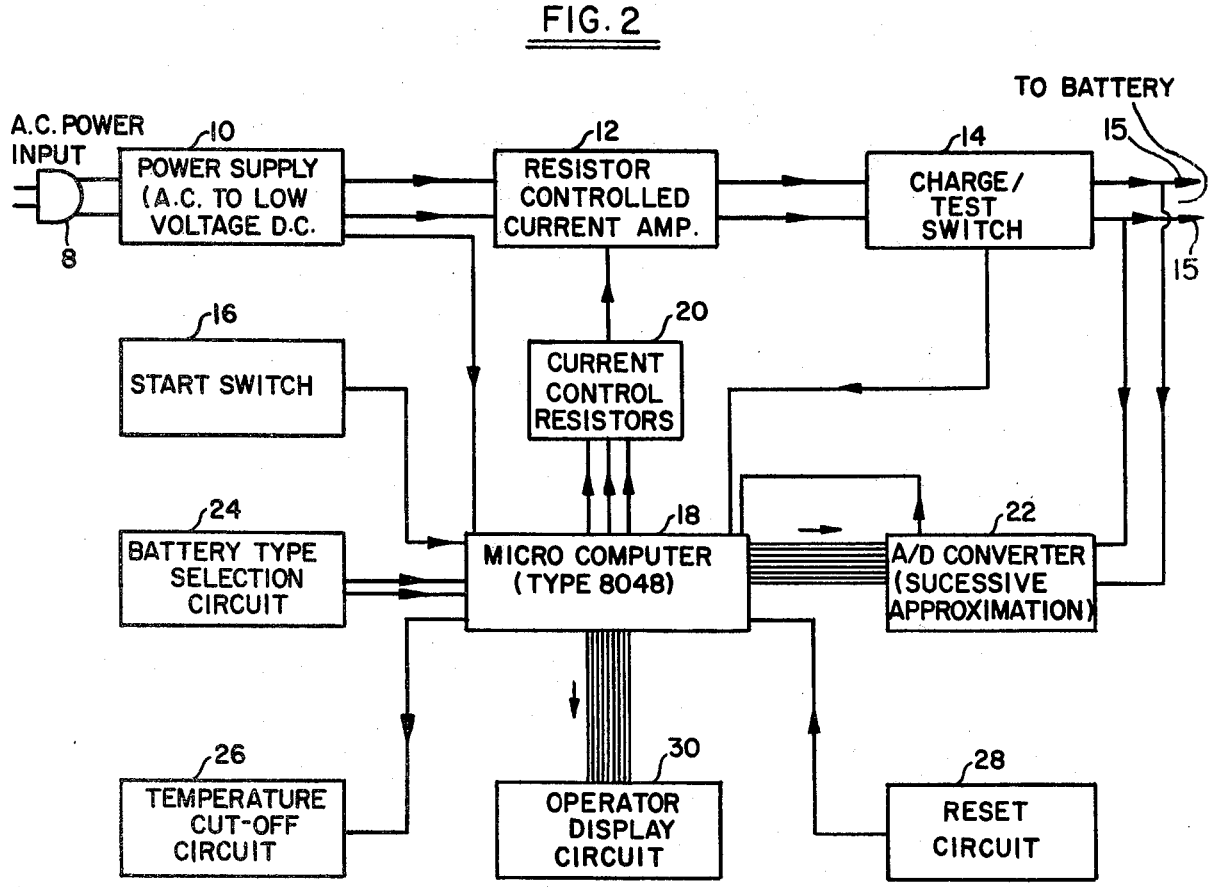

CHARGING CURVE: NICKEL-IRON BATTERY

CHARGING CURVE: LEAD-ACID BATTERY

CHARGING CURVE: LITHIUM BATTERY
(IRON-SULFIDE ELECTRODE)

CHARGING CURVE: SILVER-CADMIUM BATTERY

CONSTANT-VOLTAGE CHARGING CURVE
NICKEL-CADMIUM BATTERY

APPARATUS AND METHOD FOR CHARGING BATTERIES

This is a continuation of application Ser. No. 911,268, filed May 31, 1978, now abandoned.

CROSS-REFERENCE TO RELATED APPLICATION

The subject matter of the present application is related to that disclosed in co-pending U.S. Pat. application Ser. No. 337,174, co-filed on Jan. 5, 1982, entitled "Method of Charging Batteries and Apparatus Therefor," which application is a continuation of U.S. Pat. application Ser. No. 911,554, filed May 31, 1978, now abandoned.

FIELD OF THE INVENTION

This invention pertains to battery chargers in general and specifically to a method and apparatus for charging batteries which permits any battery to be brought to its full state of charge at a very rapid rate and also at maximum efficiency without danger of damage to the battery or to the charger. This invention will be described with particular reference to nickel-cadmium batteries but it is also capable of charging many other types of batteries in the optimum manner for each of those particular batteries.

PRIOR ART

Battery usage in various products, particularly for the retail consumer, has increased tremendously in recent years. However, batteries are still looked upon with substantial disfavor by many consumers because so much of their experience has been with primary cells which are wasteful, which must be frequently replaced and which can cause serious damage if leakage occurs. Rechargeable batteries have recently become more popular in various devices, but problems are still encountered by the consumer. Frequently, he discovers that his batteries have self-discharged and need recharging at exactly the moment when he would like to use the device, and recharging in most instances takes an inconveniently long period of time.

One solution to this is to provide maintenance charging systems in which the battery can be left on constant charge between uses. Even this system is of no value if the consumer fails to put the battery back on charge after use; in addition, most maintenance charging systems actually cause slow deterioration of the battery with time.

The solution to all of the above problems would be the provision of an adequate fast charging system which would reliably bring the battery up to its full state of charge in the shortest possible time and without risk of damage. While the prior art is replete with attempts to provide good fast charging systems, no satisfactory system has yet been developed. Most fast charging systems today require very special conditions, such as unusually expensive batteries which can accept the output of the fast charge system. Even under these special conditions, there remains a risk of serious damage to either the battery or to the charger. In addition, the present fast charge techniques do not properly charge the batteries. Depending on the termination mode used, all fast charge techniques of which we are aware either overcharge or under charge the battery, either of which causes gradual deterioration of the battery and premature failure.

In part, the failures of the prior art have been due to the inability to accurately indicate full battery charge; this has been due either to the failure of the prior art to select the proper mode of indication, or to the fact that, even if a reasonably good indicator has been selected, the charging requirements of a battery vary substantially with individual cell chemistry, with individual cell history and with ambient temperature. Thus, even an indication mode which is reasonably well selected for a particular battery type may actually provide an accurate indication only for a few cells having ideal characteristics and only if the cells are charged under proper conditions of ambient temperature.

For example, a major category of previous fast charging systems has relied upon temperature cutoff to terminate the fast charge mode. However, these systems are subject to several difficulties: they may damage the batteries due to the constant repetition of high temperature conditions, even in specially manufactured (and expensive) cells which are theoretically designed to accept high temperatures; such systems may not be safe for use with defective cells; they actually do not charge a battery to its full capacity, in high ambient temperature conditions; the charge efficiency is low and the systems are therefore wasteful; and in low ambient temperature, the battery may be driven to self-destruct by venting or possibly explosion.

Another major category of prior art fast charging systems relies on voltage cutoff. However, in many types of battery systems including nickel-cadmium, this termination mode is unreliable due to the large voltage variation which can occur with temperature, or due to cell history or individual cell characteristics. Thus, a voltage cutoff system can destroy a battery through venting. Except in unusual ideal conditions, it will never properly charge a battery to its full capacity.

A third major category of prior art battery charging termination is based on simple passage of time. However, the accuracy of this system depends on the battery, at the beginning of charge, having an assumed state of charge. There is a very high likelihood that this will not be the case and that the battery will be either over or under charged.

Most other charging methods which have been used to date are based on combinations of one or more of the above techniques. While some problems can be avoided by these combinations, at least some of them still exist. Even the best fast charge systems require expensive cell constructions; but the additional cost only serves to delay the battery deterioration which is caused by the charging system.

A more recent technique, illustrated by U.S. Pat. No. 4,052,656, seeks the point at which the slope of the voltage-versus-time curve for a given battery is zero. However, even this technique is subject to difficulties; it may detect another point at which the voltage slope is zero but at which the battery is only partially charged; in addition, even if it properly locates the zero slope point which is close to full charge, this inherently overcharges the battery and will cause battery deterioration due to heating.

All of the battery charging systems of which we are presently aware embody one or another of the above techniques and are subject to one or more of the above-listed defects. This is true despite the fact that most currently known battery chargers are designed to be used with only one type of battery and, in general, with only one selected number of battery cells of that particular type. The concept of a battery charger which can accurately and rapidly deliver full charge to a variety of different batteries including different number of cells or different types of battery couples is totally beyond the present state of the battery charging art.

OBJECTIVES

The overall object of the present invention is to overcome the difficulties inherent in prior techniques of battery charging and to provide a new and improved method of and apparatus for battery charging which fully charges batteries at a very rapid rate and at maximum efficiency and without causing either fast or slow deterioration of the battery.

A more specific object of this invention is the provision of a method and apparatus for charging batteries which accurately identifies the moment when the battery has reached full charge and which terminates charging without either under or overcharging the battery.

A further object of this invention is the provision of a method and apparatus for fully charging different batteries including different numbers of cells at the maximum possible rate and efficiency, from unknown starting conditions.

Another object of this invention is the provision of a method and apparatus for fully charging different batteries comprising different chemical couples at the maximum permissible rate and efficiency, from unknown starting conditions.

Still another object of this invention is the provision of a method and apparatus for rapidly bringing a battery to its full state of charge and terminating the fast rate charge at that point, this being accomplished without regard to the actual voltage of the battery, individual cell characteristics, individual charging history of the particular battery, or the actual ambient temperature.

In another aspect, it is an object of this invention to provide a universal method for rapidly charging various types of batteries and to further provide an apparatus which selects the proper sub-method required to rapidly charge a battery of a particular type.

In a further aspect, an object of this invention is the provision of an apparatus for applying charge current to a battery and determining accurately the moment when a battery has reached its full state of charge.

Still another object of this invention is the provision of an improved method and apparatus for fast charging batteries which recognizes accurately when a battery has reached a full state of charge, which thereupon terminates the fast charge mode, and which subsequently supplies a topping charge current to the battery to compensate for batteries which, due to a particular charging history, may produce a false indication of full state of charge.

Still another object of this invention is the provision of a method and apparatus for charging batteries which identifies intermediate states in the charging cycle of a particular battery and adjusts the rate of charging current applied so as to maintain the applied current at the optimum level for rapid, efficient and non-destructive charging.

An additional object of this invention is the provision of a method and apparatus for providing a non-destructive maintenance charge mode by which a battery can be kept at its full state of charge without gradual battery deterioration.

It is an additional object of this invention to provide a novel and unique method of evaluating the state of battery charge and of controlling the applied charge current in response to such evaluation so as to permit the battery to be brought to its full charge state at the maximum possible rate and at maximum efficiency without causing damage or deterioration of the battery, such method also including safeguards to protect against damage due to the introduction of a defective cell or to the introduction of a cell which is already at full charge.

Further objects and advantages of this invention will become apparent as the description and illustration thereof proceed.

BRIEF DESCRIPTION OF THE INVENTION

In general, the present invention comprises a method of applying a charge current to a battery, monitoring selected battery parameters during the charging, inferring from changes in these parameters an indication of the true charge condition of the battery, and controlling the applied charging energy so as to bring the battery to its full charge condition as quickly as possible without damaging the battery. In addition, the general method of this invention provides for the identification of unusual conditions which may occur in some cases, and which require charge termination to protect either the battery or the charger; furthermore, this method provides for the application of a topping charge in appropriate cases and for the application of a maintenance charge to keep the battery at full charge, all of these being accomplished without danger of damaging either the battery or the charger. All of these objectives are accomplished regardless of the actual voltage of the battery; despite wide variation in individual cell characteristics; despite previous harmful charging history in the case of a particular battery; and despite wide variations in the ambient temperature to which the battery and/or the charger may be exposed.

In particular, the present invention is based on the discovery that the electrochemical potential of a battery exhibits specific types of nonlinear changes of its value with respect to time as the battery is charged. The invention is further based on the discovery that the true charge state of the battery during charging may be analyzed by noting inflection points which occur as the electrochemical potential changes with respect to time.

In the case of specific batteries, proper charging may involve determining the occurrence of either one or more of such inflection points, or of determining a particular sequence of ordered inflection points. Controlling the proper charge mode may then involve simple conversion from a high rate fast charge mode to a suitable maintenance mode which prevents or compensates for self-discharge of the battery. In other cases, proper control of the battery charging sequency may involve a combination of inflection point determination with other analyses of the variation of voltage with respect to time or of the actual voltage at a particular time. In all of these cases, a significant aspect of this invention is the determination of inflection points in the curve which represents the electrochemical potential of the battery as a function of time.

By way of illustration of the above general method, the following specification describes appropriate variations on the specific type of analysis which may be performed to determine the inflection points, and also describes variations in the analysis which may be necessary to accommodate differing modes of battery charging such as constant voltage, constant current, etc. Specific applications include techniques for charging such batteries as nickel-cadmium, lead acid, and silver-cadmium.

In further accordance with the present invention, apparatus is described for implementing these various methods. In a preferred embodiment, the apparatus includes a suitable source of electrical energy, an analytical device for determining the necessary controlling parameters, and means for controlling the application of energy from the source to the battery.

In the particular example of a normal, discharged nickel-cadmium battery, a useful charging pattern in accord with this invention is to apply a fast-rate constant charge current to the battery until two consecutive inflection points are passed, specifically, a first one at which the sign of the slope of $dV/dt$ (that is, the sign of $d^2V/dt^2$) changes from negative to positive followed by a second one at which the sign changes from positive to negative.

These analyses will be further clarified with reference to the voltage variation of a normal nickel-cadmium battery in the detailed description hereinafter; for the present, it is sufficient to note that one basic concept presented herein is that of inflection point analysis. Specific techniques of analysis and specific sequences adapted to accommodate different battery couples may readily be developed within the context of this general procedure.

DESCRIPTION OF THE FIGURES

FIG. 1 is a graph illustrating the variation of voltage as a function of time during the charge cycle of a nickel-cadmium battery;

FIG. 2 is a block diagram illustrating the primary elements in a battery charger in accordance with this invention;

Figure 3:
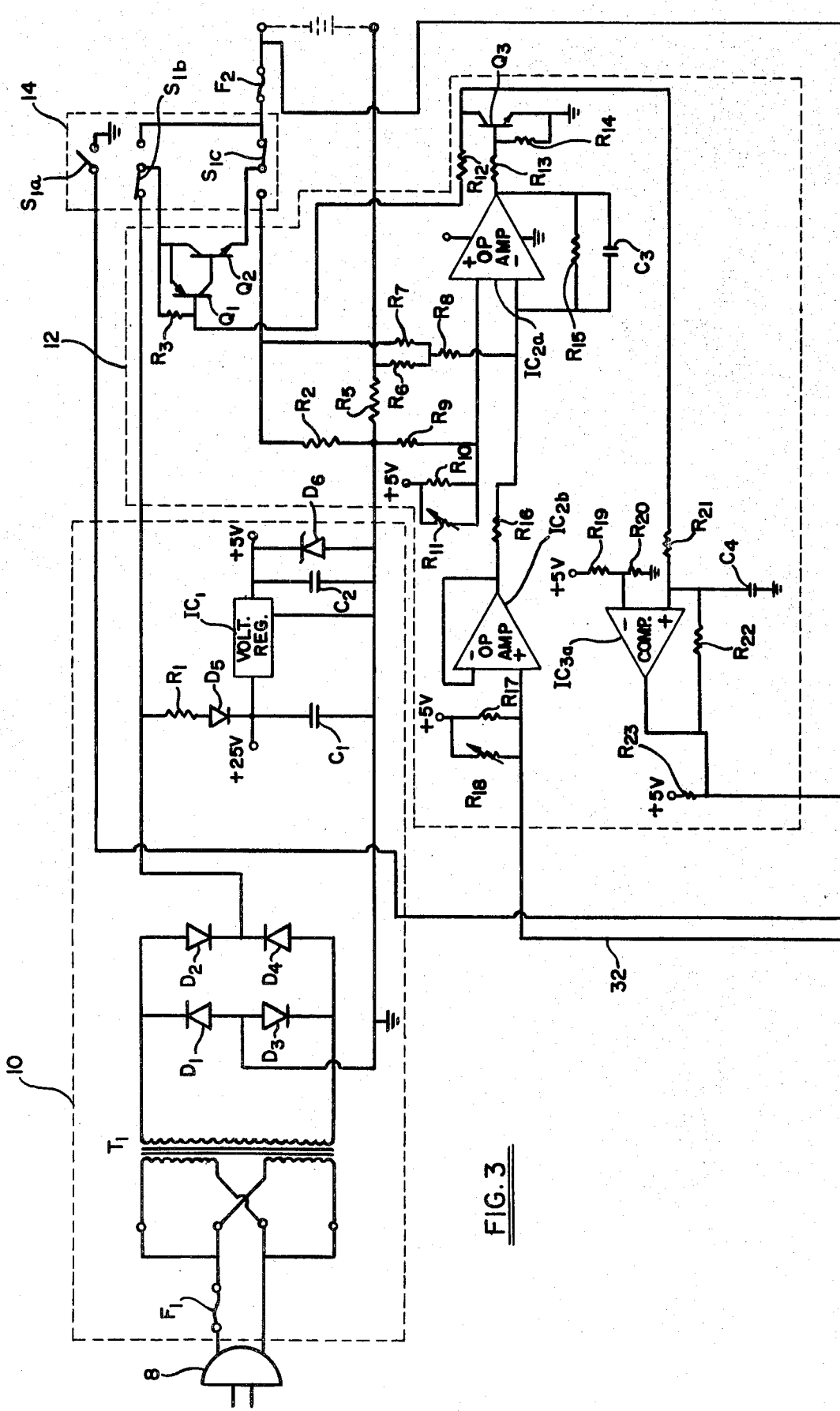
FIGS. 3 and 4 together comprise a schematic diagram illustrating specific circuits which may be provided in accordance with this invention to form the block diagram of FIG. 2.

In the following specification, an explanation is given of the battery charging process of nickel-cadmium batteries. The inventive method for either monitoring or terminating the battery charging process is next described, including several alternative terminating modes used for either protection or supplemental termination. The apparatus of this invention is then presented, including a preferred, detailed schematic circuit and a preferred embodiment of the operational sequence performed by the microcomputer. Finally, a general description of the application of this invention to other types of batteries and to other charging modes is provided.

BATTERY CHARGING PROCESS

In the course of recharging a nickel-cadmium battery, it has been found that a very typical curve is produced if the increasing battery voltage is plotted as a function of time. FIG. 1 is a representation of a typical curve of this type, as taken during a constant current charging cycle. A similarly typical curve can be obtained by plotting current against time during a constant voltage charging cycle, and a reproducible pattern also occurs if neither voltage nor current are held constant This curve may be divided into significant regions, as indicated by the Roman numerals between the vertical lines superimposed on the curve. While the curve is subject to variations in specific values of voltage or of time, the general form is similar for all nickel-cadmium batteries, including one or more cells, and the following discussion applies equally to all such batteries.

Region I of FIG. 1 represents the initial stage of voltage change which occurs when the charging cycle is first started. In this Region, the voltage is subject to significant variations based on the initial charge level of the battery, its history of charge or discharge, etc. Since the shape of this Region can vary, it is indicated in FIG. 1 by a dotted line.

Because the information in Region I varies, it is usually preferable to ignore this segment of the curve. The battery will generally traverse Region I completely within the first 30 to 60 seconds of charging and enter Region II; in general, the voltage in the Region I period increases relatively rapidly from the initial shelf voltage and the short peaks which may occur in this Region are not harmful.

As the battery approaches a more stable charging regime, it enters the portion of the curve designated Region II. Region II may be of fairly long duration with little or no increase in voltage. During this time, most of the internal chemical conversion of the charging process takes place. When significant portions of the active material have been converted, the battery begins to approach full charge and the voltage begins to increase more rapidly. This inflection point A in the curve from a decreasing rate of increase to a increasing rate of increase is identified as the transition from Region II to Region III.

Region III is characterized by a relatively rapid voltage increase as more and more of the active material is converted to the charged state. As the battery approaches full charge more closely, that is, when perhaps 90 to 95% of its active material has been converted chemically, oxygen begins to evolve. This produces an increase in the internal pressure and also an increase in the temperature of the cell. Due to these effects, the rapid increase in battery voltage begins to slow and another inflection point occurs in the curve. This second inflection point is identified as the transition point between Regions III and IV, point B.

Within Region IV, the final portions of the active material are being converted to the chemical composition of the fully charged battery. At the same time, due to oxygen evolution from material already converted, the internal pressure increase and the heating contribute to a slowing in the rate of voltage increase until the voltage stabilizes at some peak value for a short period of time. This is designated as the transition between Regions IV and V.

Within Region V, if charging is continued, the voltage of the cell starts to decrease due to additional heating as virtually all of the applied energy is converted into heat and the negative temperature coefficient of the battery voltage causes the voltage to decrease. Continued application of charging energy in this Region would eventually cause damage to the battery, either through venting or damage to the separator.

As previously noted, the relative time duration, slope or value of any portion of this curve may be modified by such factors as the initial temperature of the battery, the charge or discharge history of the battery, the particular manufacturing characteristics and the individual characteristics of the battery cell. However, the major aspects of this curve and of each of its Regions will be identifiable in any non-defective nickel-cadmium battery which is brought from a substantially discharged state to a fully charged state at a constant, relatively high current.

In specific accordance with the present invention, the above described curve and the information contained therein are utilized in a novel manner to provide an improved battery charging method. This method is much more accurate than those previously used and is, in fact, so improved that it permits rapid charging of any nickel-cadmium battery cell in a minimum time considering reasonable system cost.

Up to the present time, rapid charging techniques for batteries have carried the risk of serious damage to the battery. To help in avoiding this problem, ordinary battery cells are usually manufactured for use in conjunction only with so-called "trickle chargers" which require some 16-24 hours to bring a battery from a substantially discharged state to approximately its fully charged state. Even when this time penalty is accepted, such chargers can be harmful to the battery cells over a long period of use.

Rapid chargers are available for nickel-cadmium cells which will bring a battery to approximately full charge within aproximately one hour. However, these chargers require the use of high priced cells manufactured by special techniques so that the cells are capable of withstanding the possible harmful effects of rapid charging. This is due to the fact that the chargers cut off by one or another of the methods described above with their attendant inaccuracies.

INFLECTION POINT ANALYSIS

In accordance with this invention, a new method of controlling the battery charge process is provided which identifies exactly the conditions in the particular battery undergoing charge and correspondingly controls the application of charge current. Because of this new technique, a high rate charge current can be applied to the battery so that the battery is brought through its initial stages in the minimum possible time, for example, as little as 15 minutes for a fully discharged battery. As the battery approaches full charge, its condition is identified accurately and the charging current is reduced or cut off at exactly the proper moment in the charge cycle.

Application of this new technique requires very sophisticated processing of the available information. In concise form, as applied specifically to nickel-cadmium batteries, the method of this invention involves the identification of the inflection point between Regions II and III and by the identification of the subsequent or following inflection point between Regions III and IV. Once these two inflections points have been identified and it has been confirmed that their occurrence is in exactly that order, and only then, the battery charging current can be discontinued or reduced to a maintenance or topping mode if desired, with absolute assurance that the battery has been brought to a full state of charge regardless of its temperature, history, or individual cell characteristics. Because of the accuracy of this determination, this method can even be applied to batteries which are constructed for use only with trickle chargers.

It should be noted that the exact sequence of occurrence of these inflection points is critical to this invention. While the preferred method of this invention involves ignoring the voltage changes which occur within the first 30-60 seconds of the charging cycle, the changes which occur in Region I may overlap slightly into the time period within which the data sampling apparatus of this invention is operative. In that event, an inappropriate inflection point may occur near the beginning of Region II. The apparatus of this invention is designed so that it will ignore such inflection points until those identified above occur in the proper sequence.

An alternative statement of this technique can be made based on the identification of changes of sign of the second derivative of the voltage with respect to time. Specifically, Region II is characterized by the gradual decrease of the slope or rate of change of voltage versus time. For a fully discharged battery, Region II constitutes the largest portion of the charging period with voltage over most of this period increasing at a relatively low rate. As the battery approaches full charge, the voltage again starts to increase somewhat more rapidly. Thus, the slope which has been becoming progressively smaller and smaller starts to become larger again. This can be described as an inflection point or a change in sign of the second derivative of voltage with respect to time. Thus, we have a first such change in sign giving indication that the battery is nearing the full charge state.

During Region III the slope of the voltage-time curve increases further and further as the battery comes closer to full charge. At or near the full charge point, there is the transition between Regions III and IV at which the slope of voltage stops increasing and starts decreasing to smaller and smaller values as Region IV progresses. Here again, a change in the sign of the second derivative of the voltage-time curve occurs. This decreasing slope in Region IV indicates that virtually all of the active material in the cell has been changed to the charged state and that the energy going into the cell is beginning to convert into heat rather than continuing the charging process. Thus it is desirable to terminate charge during the early or middle part of Region IV of the voltage time curve.

These two above described changes in sign of the second derivative of the voltage-time curve are characteristic of nickel-cadmium and other electrochemical cells during the charging process. They provide a unique and reliable indication of the state of charge of the battery. A particularly important aspect of the method of this invention is, accordingly, the use of one or more of these observable changes of sign of the second derivative of the voltage-time curve to determine when to terminate battery charging.

The method of this invention of observing these inflection points, or of changes in the sign of the second derivative of the voltage-time curve of the battery charging process, can be implemented in several ways including the apparatus hereinafter described. For other types of electrochemical cells or different types of charging systems, other sequences of inflection points may be required, but the detection of all of these types of second derivative sign changes and specific sequences of them are intended to be included within the scope of this general method.

One principal advantage of inflection point analysis is that it does not depend on the actual value of the voltage of the cell nor does it depend upon the value of the rate of change, or slope, of voltage. It is an analysis of those points where the rate of change of voltage (that is, the slope of voltage) changes from decreasing to increasing or from increasing to decreasing. In turn, these points are directly related to the actual chemical occurrences within the battery being charged.

Thus, determination of state of charge and hence the most appropriate time to terminate charge is dependent only upon very universal characteristics of such batteries and not on the particular cell characteristics or characteristics which might be due to the history of use such as storage or very heavy use. It is thus more reliable and a more valid indication of the most appropriate time at which to terminate charge than previous methods.

In some cases, the inflection point technique which is appropriate for normal conditions may not be adequate, for example, if a battery is damaged or defective or if a user inadvertently places a fully charged battery on charge. In these cases, the normal indicative points may not occur at all or they may possibly occur within the first period of time in which the apparatus is not sampling data. In order to protect against these possibilities, the present invention further includes the provision of specific controlling techniques or modes which may be used in combination with the basic method described above.

ABSOLUTE VOLTAGE CHANGE ANALYSIS

A first of these techniques which can be incorporated is that of terminating the application of charging current to the battery immediately upon the occurrence of a negative change of voltage. By reviewing the curve of FIG. 1 it will be noted that there is no point in the normal charge cycle when a negative voltage change occurs. Thus, if a negative voltage change is encountered, it must mean that the battery is either defective of that it is already fully charged and that it has entered Region V of the curve. Accordingly, provision is preferably included to terminate the high rate charge immediately upon the occurrence of a negative voltage change. Preferably, the value of this change should be large enough so that termination is not inadvertently caused by inaccuracies in the monitoring equipment.

It is also noted that the absolute voltage change analysis is utilized to prevent fast charging of a fully charged battery which is inadvertently placed on fast charge by the operator. Specifically, a fully charged battery to which a high current is applied will traverse most, if not all of Regions I, II and III very quickly. In many cases, this will occur in the time period which a normally discharged battery would require to traverse Region I. Since the system is instructed not to look for inflection points during the first 30 to 60 second portion of the cycle, at least one and perhaps both of the significant inflection points, point A and B will pass before the system begins to monitor for them.

Therefore, as monitoring of the fully charged battery begins, the battery will be passing through Region IV and entering Region V. Within a fairly short time after it has been placed on charge (e.g., 1-3 minutes) the battery will enter Region V and its voltage will begin to decrease. As soon as the negative voltage change is large enough to indicate to the apparatus that the function of voltage with respect to time is no longer monotonic, the apparatus will discontinue the fast charge rate. Preferably, the charging mode then shifts into a maintenance mode as will be hereinafter described. Since the high rate is only maintained for a short period of time, the battery will not be damaged by this sequence. It is also noted that even defective batteries will not be driven into a hazardous condition by the continuation of a maintenance charge mode after shut down of the high rate due to a negative voltage change.

VOLTAGE SLOPE ANALYSIS

While the charge profile of nickel-cadmium batteries does not lend itself to advantageous use of this technique, other battery couples exhibit profiles wherein termination should be predicated upon the occurrence of a particular voltage slope. Thus, in a couple wherein Region V involves a slow downward drift of voltage rather than a sharp decrease as in the nickel-cadmium profile, the occurrence of a negative slope is useful in the same manner as the absolute voltage change analysis just described.

VOLTAGE LEVEL ANALYSIS

In some cases of dried or otherwise damaged nickel-cadmium cells, application of a charging current can cause the voltage to increase to a level significantly beyond the normal voltage of an operative cell. Accordingly, the apparatus of this invention includes the provision of a voltage level sensing means which terminates charge if a predetermined level of voltage is encountered. In other battery couples, this may serve as a primary charge termination mode rather than as a secondary safeguard.

TIME ANALYSIS

In other defective cells, the application of a high charge current may simply be allowed to continue for an undue length of time because the energy is being converted to heat or to oxygen evolution, etc. In these instances, the defect in the cell may prevent the inflection points from occurring and a maximum time cutoff is provided.

In each of the above cases, the exact quantity chosen for the negative voltage change, for the negative change in voltage slope, for the absolute level of voltage reached, or for the maximum time reached is, of course a predetermined number based on the type of cell for which the particular charger is intended.

MAINTENANCE CHARGE MODE

After the main charge regime is terminated by one or more of the above five methods of analysis, it is preferred to proceed into two other charge regimes. The first of these is a programed overcharge or surcharge to insure that all possible active material in the cell is fully converted to the charged state and that all possible capacity in the cell will be available to the user. The preferred method of overcharge or surcharge is to charge at a relatively low charge rate for a fixed amount of time depending on the type and size of the cell. This guarantees that the cell is given a full amount of additional charge but at a low enough rate to avoid damage.

The fixed time also means that the cell is not subject to long periods of time of overcharge which would subject the cell to increased internal pressures and heat which would eventually damage internal structures such as separators.

At the end of the surcharge or overcharge period it is very desirable to provide only a maintenance charge which is used to compensate for the internal self-discharge characteristics of all electrochemical cells including nickel-cadmium cells. Nickel-cadmium cells can self-discharge as much as 10% to 30% per month depending on the storage temperature and the particular characteristics of the cell. One method of maintenance charging is to apply a low to medium charge current for a short period of time one or more times per day. The preferred rate is a charging rate of "C" (a charge rate representing the same number of amperes of charge as the ampere-hour rated capacity of the cell) for 15 to 30 seconds every 6 hours. This provides approximately twice the typical loss rate in ampere hours of the cell without causing any significant heating or pressure buildup in the cell. The particular charge rate and particular choice of charged time to resting time can be varied over a very wide range. The method is merely to replace the calculated or measured energy lost to self-discharge of the cell.

CHARGING APPARATUS

FIG. 2 is a block diagram showing the major elements of electronic circuitry which are used in accordance with this invention to implement the above described charging method. The flow of charging current in FIG. 2 runs from an AC power input plug 8, connectable to an ordinary source of line current, to a power supply 10 which converts the AC input to low voltage DC. Next, the current passes through a resistor-controlled current amplifier 12, and then through a charge/test switch 14 and finally to the output terminals 15 at which a single or multi-cell battery to be charged is connected. The power supply may, of course, be an alternative source of DC power such as a larger battery or a converter operated from a DC source. The amplifier is preferably a standard series-pass current regulator although other types of controllable current amplifiers could be used. The charge/test switch 14 normally connects the current amplifier 12 to the battery for the application of charging current; this switch also includes a test position for use in a test mode which is described below.

The remainder of the block diagram illustrates a preferred embodiment of the apparatus for performing the method of this invention. In the illustrated embodiment, a start switch 16 is provided; this comprises a momentary contact switch for initiating the sequence of operations. It is connected to one input port of a microcomputer 18. In the preferred embodiment of this invention, this is an Intel type 8048 microcomputer. This is a self-contained computer including a program memory for storing instructions, a register memory and a central processing unit (CPU) for controlling the execution of the stored instructions. The 8048 microcomputer is more completely described in the publication entitled "Microcomputer User's Manual" No. 98-A270A, published by the Intel Corporation of Santa Clara, Calif. 95051, which is included herewith as Appendix A.

When the start switch 16 is actuated, which could be accomplished automatically on connection of a battery to the output lines, the microcomputer 18 first allows the full charge current to be applied to the battery through the amplifier 12 for a predetermined period of time, usually between 30 and 60 seconds, which allows the battery to be brought through the segment of FIG. 1 identified as Region I. For nickel-cadmium batteries of the sub-C size, the preferred time is 40 seconds. This application of power can be at full rated current since even a defective battery or a fully charged battery will not be seriously damaged by the application of this power for this short an interval. The application of power is controlled by the micro computer 18 by its selection of the appropriate current control resistor 20 through which to apply the input signal to the current amplifier 12. After an appropriate period of time has passed as described above, the microcomputer 18 makes use of the analog-to-digital converter (A/D) to determine the battery voltage. The converter 22 is preferably of the successive approximation type in which successive approximate digital values of battery voltage generated by the microcomputer 18 are compared to the actual battery voltage until a close approximation is achieved. This information is then fed back into the microcomputer 18 which then proceeds to execute its program so as to charge the battery in accordance with the method described above.

In addition to the basic elements of the block diagram already mentioned, the circuit should provide certain additional features. If the battery charger is of a type adapted to handle a variety of battery sizes and types, a battery type selection circuit 24 is included which selects the specific program for the given battery type from several stored in the computer. This may be done either by the operator or automatically by some identification means such as particular terminal types provided on the battery itself.

The system also preferably includes a temperature cutoff circuit 26. The purpose of this circuit is to prevent charging if the ambient temperature is either so low or so high as to cause damage to the battery or to the charging circuit itself.

Reset circuit 28 is provided to reset the entire microcomputer program to time zero as soon as power is supplied to the system, or in the event of a power interruption. This is done to prevent upredictable charging effects which might occur if the computer were to be initiated at an incorrect point in its program.

Finally, the operator display circuit 30 provides for communicating such information as may be appropriate to the operator. In the case of a simple charger for use by a consumer, the display 30 may consist only of an illuminatable lamp to indicate that charging is in process. In the case of a complex battery charger used by a qualified technician, the display circuit may provide for the display of a variety of different information which may be of use to the technician in evaluating the condition of the battery.

Figure 4:
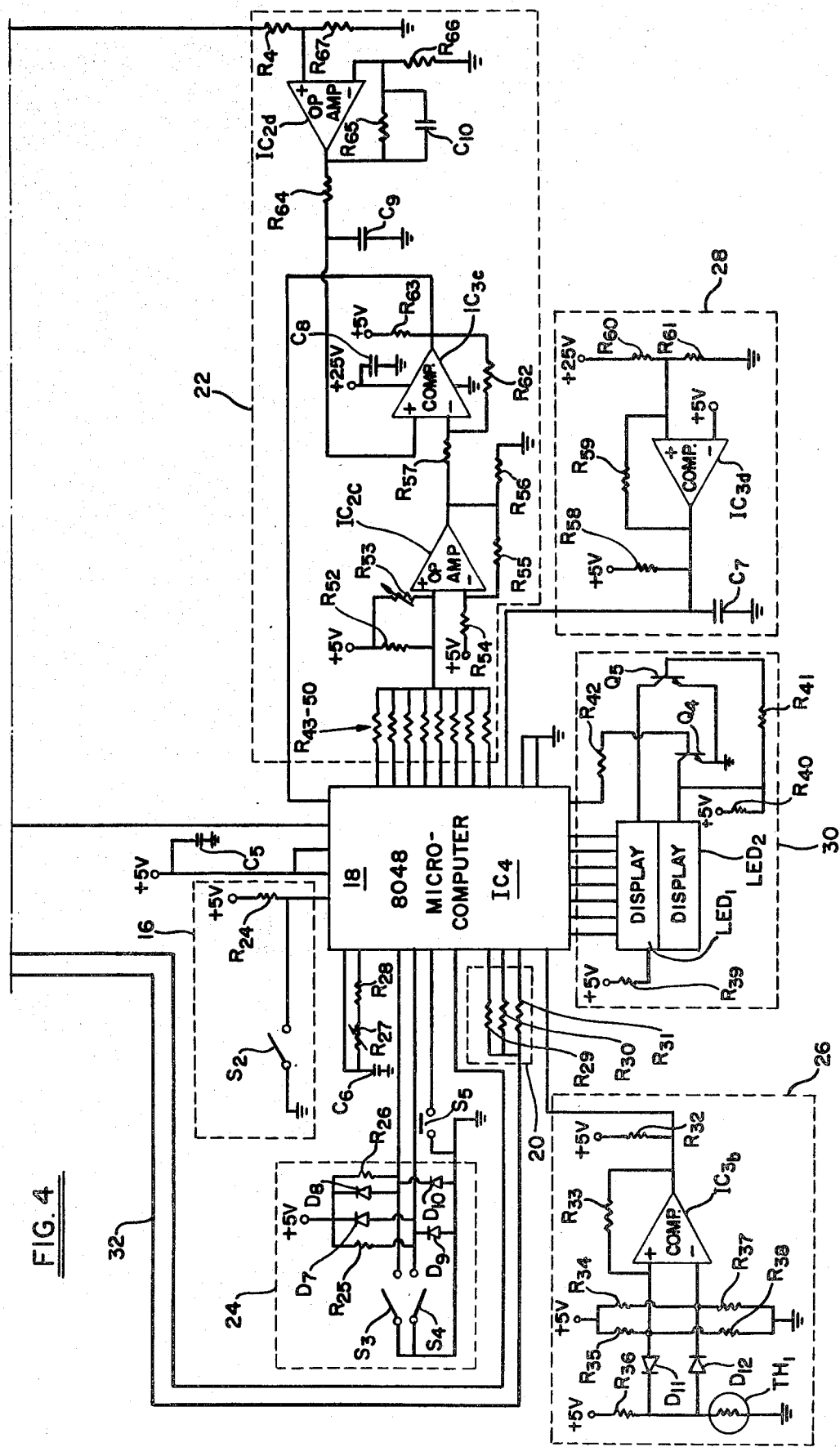
Figure 5:
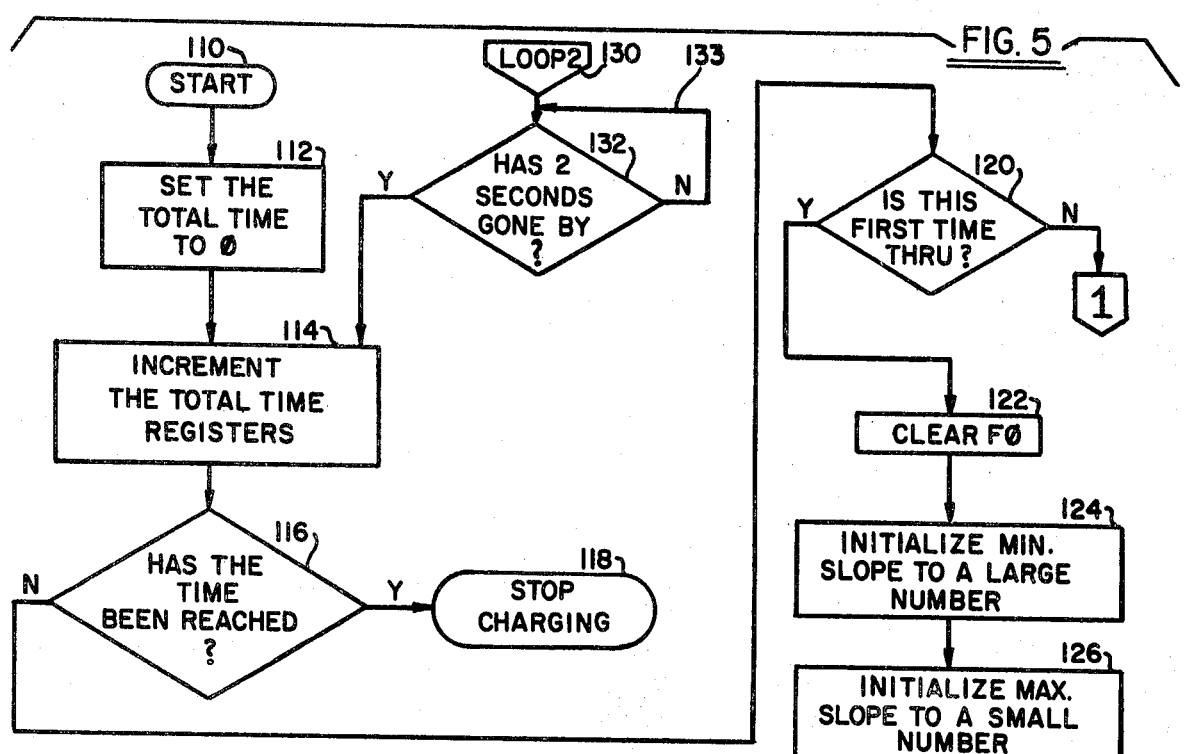
FIGS. 5 through 9 schematically illustrate the sequence of operations performed by the microcomputer shown in FIG. 4.
Figure 6:
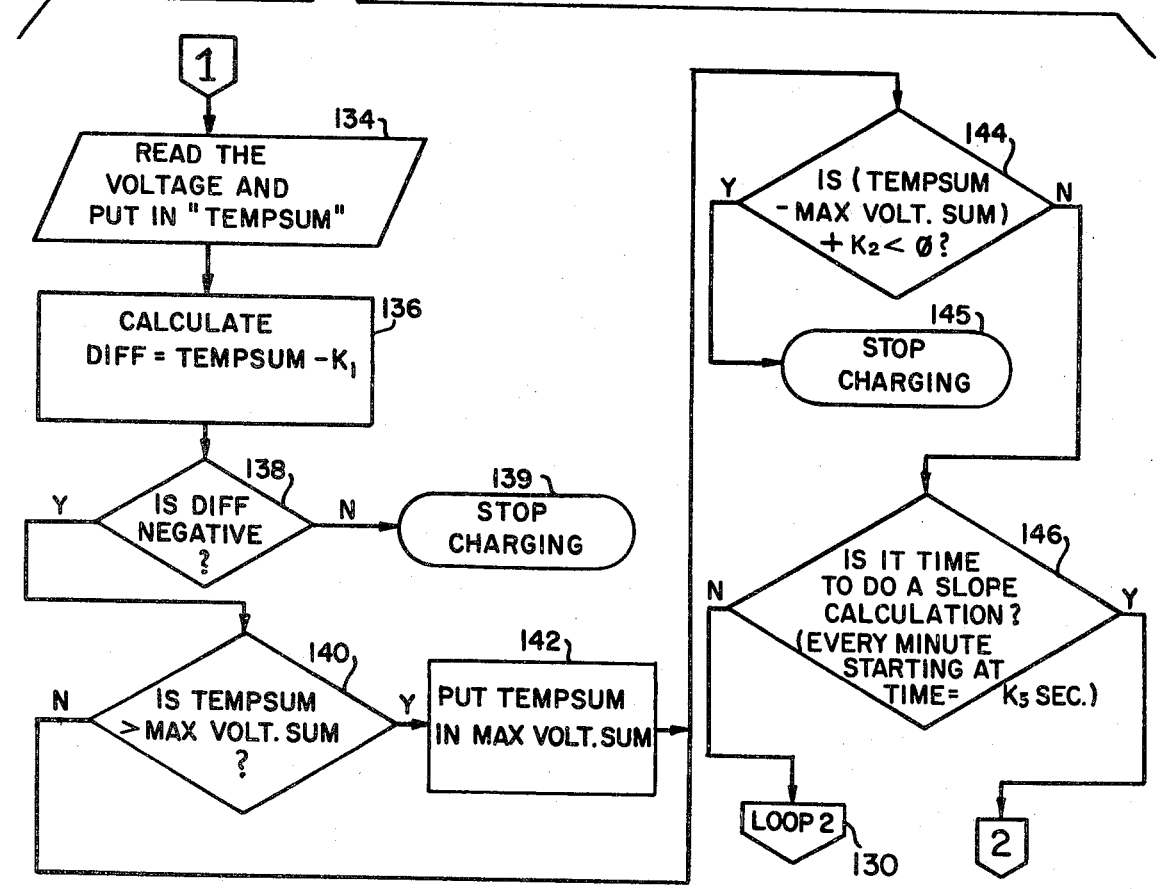

FIGS. 3 and 4 together comprise a schematic diagram of one suitable embodiment of FIG. 2. The respective segments of the circuit as identified in FIG. 2 are enclosed in dotted line boxes identified by corresponding numbers.

In the specific embodiment of these figures, 8 a conventional line plug is provided for connection to a source of power. The power supply 10 includes a transformer $T_1$ and a full wave bridge rectifier made up of diodes $D_1$–$D_4$. The output from the bridge, which may be approximately 20 volts D.C., is applied through amplifier 12 and switch 14 to the battery (shown in dotted line illustration). A portion of the bridge output is also applied to a filter made up of resistor $R_1$, diode $D_5$ and capacitor $C_1$ and to voltage regulator $IC_1$. Regulated voltages of 25 volts and 5 volts for use in the other portions of the circuit are taken at the indicated output terminals.

The resistor-controlled current amplifier 12 operates according to outputs taken from the microcomputer 18 through current control resistors 20 shown in FIG. 4. In accordance with its internal program, the computer 18 selects a current level by completing a circuit through one of the current control resistors $R_{29}$, $R_{30}$, or $R_{31}$. This controls the input to operational amplifier $IC_{2b}$ which is taken at the midpoint of a voltage divider made up of the parallel combination of resistors $R_{18}$ and $R_{17}$, and the selected current control resistor. The output from the amplifier $IC_{2b}$ is compared to the voltage developed across a current shunt resistor $R_5$. Any error signal due to a difference is amplified by operational amplifier $IC_{2a}$ and applied to driver transistor $Q_3$. The output of transistor $Q_3$ is applied to current control transistors $Q_1$ and $Q_2$ to produce a very stable constant current which is applied to the battery through $S_{1c}$.

If the output current to the battery cannot reach the selected current level, for example because there is no battery connected, transistor $Q_3$ is turned fully on which, through the comparison amplifier $IC_{3a}'$ supplies a signal to the computer which turns the system off.

As shown in FIG. 3, a momentary contact push button switch 16, which may be operator-controlled or may be built into the battery socket, supplies a signal to the battery to indicate that the charging cycle should be initiated. This could also be accomplished by monitoring for the presence of battery voltage or current flow.

Selection circuit 24 (FIG. 3) comprises a plurality of selector switches $S_3$, $S_4$ which allow the operator to select a particular computer program appropriate to a particular battery. Diodes $D_7$-$D_{10}$ are provided to protect the computer 18. Alternatively, this selection could be provided automatically by using different sets of unique terminals to which different battery types are connected. Also, the entire selection circuit 24 might be omitted if the charger is intended for use with only a single battery type.

Temperature cut-off circuit 26 comprises a safety circuit to prevent operation at temperatures outside a predetermined permissible range. In the particular arrangement shown, the voltage at the midpoint of the voltage divider comprising resistor $R_{36}$ and thermistor $TH_1$ controls the input to both sides of the comparator amplifier $IC_{3b}$. In the case of a high temperature (e.g., 125° F.), the resistance of $TH_1$ is low which reduces the voltage input to the positive side of $IC_{3b}$; in the case of a low temperature (e.g., 25° F.), the resistance of $TH_1$ is high which increases the voltage at the negative side of $IC_{3b}$. Either extreme produces a low output signal from $IC_{3b}$ which instructs the computer to discontinue charging.

In subcircuit 22, the battery develops an input signal across the voltage divider $R_4/R_{67}$ which is amplified in operational amplifier $IC_{2d}$. The resistances $R_{64}$, $R_{65}$ and $R_{66}$ and capacitors $C_9$ and $C_{10}$ comprise a filter on the output of $IC_{2d}$ and this signal is used as one input to comparator amplifier $IC_{3c}$.

At the same time, another input to comparator $IC_{3c}$ is developed through operational amplifier $IC_{2c}$ from a voltage divider comprising the parallel resistors $R_{52}$ and $R_{53}$ and a binary coded combination of the resistor ladder $R_{43}$-$R_{50}$ as selected by the computer. Resistors $R_{44}$-$R_{50}$ each have values which are twice the value of the preceding sequential resistor. The computer, under the instruction of its program as will be described hereinafter, selects an initial minimum value, for example, by turning on only $R_{43}$. This develops a voltage across $IC_{2c}$ which is compared in $IC_{3c}$ to the signal received from the battery. If this minimum voltage supplied from the computer is not equal to or greater than the battery voltage, then successively increased values are tried by the computer until a match is reached. This information is communicated back to the computer from the output of $IC_{3c}$ and the computer uses the last input to the comparison circuit as the battery voltage.

In reset circuit 28, the comparator $IC_{3d}$ amplifies a signal derived from the 25 volt supply and compares it to a 5 volt reference. If the 25 volt signal goes below approximately 10 volts, as would occur upon the removal of power from the system either due to a power failure or due to the operator unplugging the charger, the output signal from the comparator instructs the computer to return all of its programming functions to the initial conditions; that is, those which must be used when a new charge cycle is initiated. This can occur either during power-down as the power is falling from normal input to zero due to a power failure or during power-up as the power is building from zero to its normal level when the system is first connected to a power source. In either case, this system is useful to ensure that the computer does not begin a cycle at some indeterminate midpoint in its cycle with inappropriate information stored in its memory.

The display system 30 is utilized by the computer to communicate appropriate information to an operator. As illustrated, the display preferably comprises two seven segment display elements and transistors $Q_4$ and $Q_5$ which form a conventional strobing control which enables eight output lines to control both displays. Alternatively, the display might comprise simply a single indicator lamp.

Finally, element 14 (FIG. 3) comprises a charge/test switch. In the normal, charge position $S_{1b}$ and $S_{1c}$ connect the current controlled amplifier 12 and resistor network (items 12 and 20 of FIG. 2) so that current from power supply 10 is supplied through $S_{1b}$ to transistors $Q_1$ and $Q_2$ to switch $S_{1c}$ to the battery with a return path through resistor $R_5$. In the test position, the battery is connected through $S_{1b}$ to transistors $Q_1$ and $Q_2$ through switch $S_{1c}$ to resistor $R_2$ and returning through resistor $R_5$ to the battery. For example, this could allow the system to be used to discharge the battery at a predetermined rate and, by means of appropriate programming, to determine and display the ampere-hour capacity of the battery. In addition, switch $S_{1a}$ provides an alternate signal to the microcomputer 18 to instruct it to enter the charge program or a separate discharge program wherein it tests the condition of the battery.

In one embodiment of FIGS. 3 and 4, the following circuit elements were used:

| | | | |
|---|---|---|---|
| $R_1$ | 10 ohm ¼ watt | $R_{16}$ | 8.2K ohm ¼ watt |
| $R_2$ | .3 ohm 1 watt | $R_{17}$ | 10k ohm ¼ watt |
| $R_3$ | 1k ohm ¼ watt | $R_{18}$ | Trimpot 100k ohm |
| $R_4$ | 100k ohm | $R_{19}$ | 100k ohm ¼ watt |
| $R_5$ | .1 ohm 1 watt | $R_{20}$ | 22k ohm ¼ watt |
| $R_6$ | 10 ohm ¼ watt | $R_{21}$ | 10k ohm ¼ watt |
| $R_7$ | 12 ohm ¼ watt | $R_{22}$ | 220k ohm ¼ watt |
| $R_8$ | 560 ohm ¼ watt | $R_{23}$ | 10k ohm ¼ watt |

-continued

| | | | |
|---|---|---|---|
| $R_9$ | 560 ohm ¼ watt | $R_{24}$ | 10k ohm ¼ watt |
| $R_{10}$ | 10k ohm ¼ watt | $R_{25}$ | 10k ohm ¼ watt |
| $R_{11}$ | Trimpot 100k ohm | $R_{26}$ | 10k ohm ¼ watt |
| $R_{12}$ | 1k ohm ¼ watt | $R_{27}$ | Trimpot 3k ohm |
| $R_{13}$ | 10k ohm ¼ watt | $R_{28}$ | 8.2k ohm ¼ watt |
| $R_{14}$ | 2.2k ohm ¼ watt | $R_{29}$ | 100k ohm ¼ watt |
| $R_{15}$ | 1 Megohm ¼ watt | $R_{30}$ | 12k ohm ¼ watt |
| $R_{31}$ | 4.7k ohm ¼ watt | $R_{61}$ | 10k ohm ¼ watt |
| $R_{32}$ | 10k ohm ¼ watt | $R_{62}$ | 1 Megohm ¼ watt |
| $R_{33}$ | 1 Megohm ¼ watt | $R_{63}$ | 10k ohm ¼ watt |
| $R_{34}$ | 33k ohm ¼ watt | $R_{64}$ | 47k ohm ¼ watt |
| $R_{35}$ | 22k ohm ¼ watt | $R_{65}$ | 33k ohm ¼ watt |
| $R_{36}$ | 4.7k ohm ¼ watt | $R_{66}$ | 22k ohm ¼ watt |
| $R_{37}$ | 22k ohm ¼ watt | $R_{67}$ | 100k ohm ¼ watt |
| $R_{38}$ | 33k ohm ¼ watt | $C_1$ | 1000 microfarads 35 volts |
| $R_{39}$ | 680 ohm ¼ watt | $C_2$ | .1 microfarads 35 volts |
| $R_{40}$ | 1k ohm ¼ watt | $C_3$ | 10 microfarads 35 volts |
| $R_{41}$ | 1k ohm ¼ watt | $C_4$ | 1 microfarads 35 volts |
| $R_{42}$ | 1.8k ohm ¼ watt | $C_5$ | .1 microfarads 35 volts |
| $R_{43}$ | 5k ohm ¼ watt | $C_6$ | 20 picafarads 35 volts |
| $R_{44}$ | 10k ohm ¼ watt | $C_7$ | 10 microfarads 35 volts |
| $R_{45}$ | 20k ohm ¼ watt | $C_8$ | .1 microfarads 35 volts |
| $R_{46}$ | 40k ohm ¼ watt | $C_9$ | 10 microfarads 35 volts |
| $R_{47}$ | 80k ohm ¼ watt | $C_{10}$ | 10 microfarads 35 volts |
| $R_{48}$ | 160k ohm ¼ watt | $D_1$ | 3 amp 50 volts |
| $R_{49}$ | 320k ohm ¼ watt | $D_2$ | 3 amp 50 volts |
| $R_{50}$ | 640k ohm ¼ watt | $D_3$ | 3 amp 50 volts |
| $R_{52}$ | 270 ohm ¼ watt | $D_4$ | 3 amp 50 volts |
| $R_{53}$ | Trimpot 3k ohm | $D_5$ | 1 amp 50 volts |
| $R_{54}$ | 10k ohm ¼ watt | $D_6$ | Zener diode 5.6 volts ½ watt |
| $R_{55}$ | 100k ohm ¼ watt | $D_7$ | Type IN4148 .1 amp 50 volts |
| $R_{56}$ | 2.2k ohm ¼ watt | $D_8$ | Type IN4148 .1 amp 50 volts |
| $R_{57}$ | 10k ohm ¼ watt | $D_9$ | Type IN4148 .1 amp 50 volts |
| $R_{58}$ | 10k ohm ¼ watt | $D_{10}$ | Type IN4148 .1 amp 50 volts |
| $R_{59}$ | 220k ohm ¼ watt | $D_{11}$ | Type IN4148 .1 amp 50 volts |
| $R_{60}$ | 10k ohm ¼ watt | $D_{12}$ | Type IN4148 .1 amp 50 volts |
| $Q_1$ | PNP transistor 3 amp 40 volt type TIP-30 | | |
| $Q_2$ | NPN transistor 15 amp 40 volt type TIP-35 | | |
| $Q_3$ | NPN transistor .5 amp 40 volt type MPS A05 | | |
| $Q_4$ | NPN transistor .5 amp 40 volt type MPS A05 | | |
| $Q_5$ | NPN transistor .5 amp 40 volt type MPS A05 | | |
| $IC_1$ | Voltage regulator 5 volt .5 amp type 78M05 | | |
| $IC_2$ | Quad operational amplifier type LM 324 | | |
| $IC_3$ | Quad comparator type MC 3302 | | |
| $IC_4$ | Microcomputer type 8048 | | |
| $T_1$ | Transformer 120/240 volt AC input 10-20 volt AC output 1-5 amps | | |
| $LED_1$ | 7 segment light-emitting diode display common cathode | | |
| $LED_2$ | 7 segment light-emitting diode display common cathode | | |
| $F_1$ | Slow blow fuse, 1 amp | | |
| $F_2$ | Fuse, 5 amps | | |
| $TH_1$ | Thermistor RL28F1 | | |
| $S_1$ | Switch 3 pole double throw (3 amp contacts) | | |
| $S_2$ | Switch SPST N.O. momentary | | |
| $S_3$ | Switch SPST | | |
| $S_4$ | Switch SPST | | |
| $S_5$ | Switch SPST | | |

FLOW CHART—MICROCOMPUTER OPERATION

FIGS. 5-8 comprise a flow chart of the basic operations which are performed within the microcomputer. The flow chart illustrated in FIGS. 5-8 summarizes the program steps and has been prepared at a level of detail which would permit an experienced programmer to complete the detailed implementation of this invention in a type 8048 microcomputer but which, at the same time, is not so detailed as to require repetitious description of iterative steps.

As has previously been noted, when power is first applied to the system, the reset circuit 26 automatically sets all operations of the computer 18 to an initial or "reset" mode. In the flow chart, the "start" block 110 signifies the application of the start signal to the computer due to the closing of the start switch 16 of FIG. 2. Immediately, the internal total time register is set at 0. This is indicated by block 112. The further steps of the process shown in FIGS. 5-8 are then performed by the microcomputer.

The next step in the process, identified as block 114, is to increment the total time register. Then the program moves to block 116 which does a comparison between a maximum allowable time as set for the particular battery and the time that has elapsed. If the comparison shows that the maximum allowable total time has been reached, the sequence moves to block 118 which indicates the execution of the sequence of instructions to stop the charging cycle, including either turning off the charging current or turning it to a lower value. This may also involve changing to a timed overcharge mode or to a surcharge mode to to a maintenance mode if desired.

If the total time has not been reached, which it will not this first time through, the microcomputer goes on to block 120. Here, the time register is again used to determine whether this is the first time through this sequence of steps. If it is, then the program moves to the series of steps 122-128 which direct the computer to set up certain registers within the computer so that they are ready for use later in the program. First, as indicated at block 122, a flag identified as F∅ is cleared. This flag will later be set upon the occurrence of a first inflection point or change in sign of the second derivative. The program then continues through block 124, 126 and 128. As indicated in the drawing, each of these steps controls the placement of an initial value in particular registers, namely, "Minimum Slope", "Maximum Slope", and "Maximum Voltage Sum" respectively. The "Minimum Slope" register is set to a large number, while the "Maximum Slope" and "Maximum Voltage Sum" registers are each set to a large negative number such as −10,000. The use of these registers will be described below. Thereafter, the program moves to block 130 designated "loop 2". This is a common return location to which the program is redirected after each of several alternative sequences have been completed. In this instance, after the three registers have been initialized as described above, the program moves through block 130 to block 132.

In block 132, the stated interrogation is "has two seconds gone by?". Block 132 together with the closed loop 133 for a negative response to this interrogation simply amount to a delay circuit to prevent the program from proceeding until a period of time, arbitrarily selected to be two seconds, has passed since the last time that the time register was incremented in accordance with block 114. After each such increment, a two second timer is restarted and it runs while the computer program proceeds through its next sequence of steps. At the end of the sequence, the program returns to block 130 and the computer is held in the delay loop until two seconds have passed. The time register is then incrementally increased and the computer proceeds to its next sequence of steps.

The program then continues through the previously described loop. The interrogation of block 116 is asked and answered in the same manner as previously described and, since the maximum allowable time has not yet been reached, the program moves directly to block 120. When the interrogation of block 120 is asked, the answer will be in the negative since this is the second time through this sequence. At this point, the program directs the computer through location 1 in FIG. 5 to location 1 in FIG. 6 and thus into block 134.

This instruction, namely, to read the voltage and put in "Tempsum", operates the analog-to-digital converter as previously described in connection with FIG. 2 and stores the resultant digital statement of the battery voltage in a storage register in the microprocessor. This register is referred to as "Tempsum".

The program sequence next proceeds to block 136 where the descriptive step is stated as "Calculate Difference=Tempsum-$K_1$".

This is followed immediately by block 138 which requires whether the difference is negative. If the difference is either 0 or greater than 0, the answer is no and the computer is directed by step 139 to stop charging. This represents a sequence of steps which would be the same as that stated above with regard to block 118. If the difference is negative, then the answer is yes and the program proceeds to block 140.

In fact, the combination of steps 134, 136, and 138 is a test for an excessively high level of battery voltage. Thus, $K_1$ is preset at a value which, for the particular battery being charged, represents an excessively high level of voltage, which could only be reached by a defective battery. Accordingly, if the value of voltage in the register "Tempsum" equals or exceeds $K_1$, the battery must necessarily be defective, or some portion of the charger is defective, and the charging sequence must be stopped immediately. For example, $K_1$ may equal 2 volts per cell for a nickel-cadmium battery. In normal charging, the battery voltage will never equal $K_1$, and the answer to the interrogation of step 138 will be affirmative so that the program proceeds normally to step 140.

In step 128, the register "Max. Voltage Sum" was set to an initial large negative number. In step 140, the value in "Tempsum" and the value in "Max. Voltage Sum" are compared. If the value in "Tempsum" is greater than that in "Max. Voltage Sum", then the value in "Tempsum" is placed in the "Max. Voltage Sum" register by instruction 142 and the program proceeds to step 144. If not, then the "Max. Voltage Sum" register value is left unchanged and the program proceeds directly to step 144.

In step 144, the difference between the values used in "Tempsum" and in "Max. Voltage Sum" are compared to another constant $K_2$, which is preset according to the battery being charged. In fact, the test being performed by the series of program steps 140, 142 and 144 is that of checking to see if the voltage has moved downwardly by more than a given minimum amount from a previously achieved maximum value. As described above in the section entitled Absolute Voltage Change Analysis, if this has occurred, this must indicate that the battery has already passed its maximum charge level and is in the region indicated as Region V in FIG. 1, or that the battery is defective. Accordingly, the program is instructed to move to block 145 which stops the charging process in the same manner as steps 118 and 139.

If this is not the case; that is, if the latest value of battery voltage present in "Tempsum" is either equal to or greater than the largest value previously recorded, then it is known that the battery is somewhere in Regions I—IV and charging can safely continue.

It should be noted that the value $K_2$ is a small number. Its purpose is to prevent spurious or transient errors caused by drift in the electronic circuit values, or small negative changes in the battery voltage, etc., from shutting down the charging sequence. It is also noted that this test is preferably performed even during the initial period identified as Region I of FIG. 1 wherein the battery voltage is varying in a somewhat undetermined manner. This is because a negative change in battery voltage which exceeds $K_2$ even in this Region is also indicative of a defective battery. $K_2$ may equal 25 millivolts per cell for nickel-cadmium batteries.

The next stage in the process, identified as block 146, interrogates the timing system to determine whether a slope calculation should be done. This actually represents the beginning of the inflection point analysis previously described; as will be clear from the following description of FIGS. 5 and 6, the phrase "Slope Calculation" used in this program identifies the series of steps which locate the inflection points in the curve of FIG. 1.

As indicated in step 146, the slope calculation is performed every minute beginning at an arbitary time identified as $K_3$ seconds. $K_3$ is the time interval chosen to allow the battery to pass through the initial stage identified previously as Region I and is usually between 30 and 60 seconds. $K_3$ is preferably 40 seconds in the case of nickel-cadmium batteries.

The first several times through the program, the interrogation of step 146 will be answered in the negative and, as indicated, the program returns to step 130. Thus, until the total time registers equal the value $K_3$, the program simply directs the computer to monitor the time and voltage to make sure that neither assigned maximum has been exceeded, these checks being performed at steps 116 and 134–138 respectively, and also monitors the voltage for a negative drop in steps 140–144. Once the total time register reaches $K_3$, the interrogation of step 146 is answered in the affirmative and the program passes through connection point 2 and enters the series of steps shown in FIG. 7.

Figure 7:
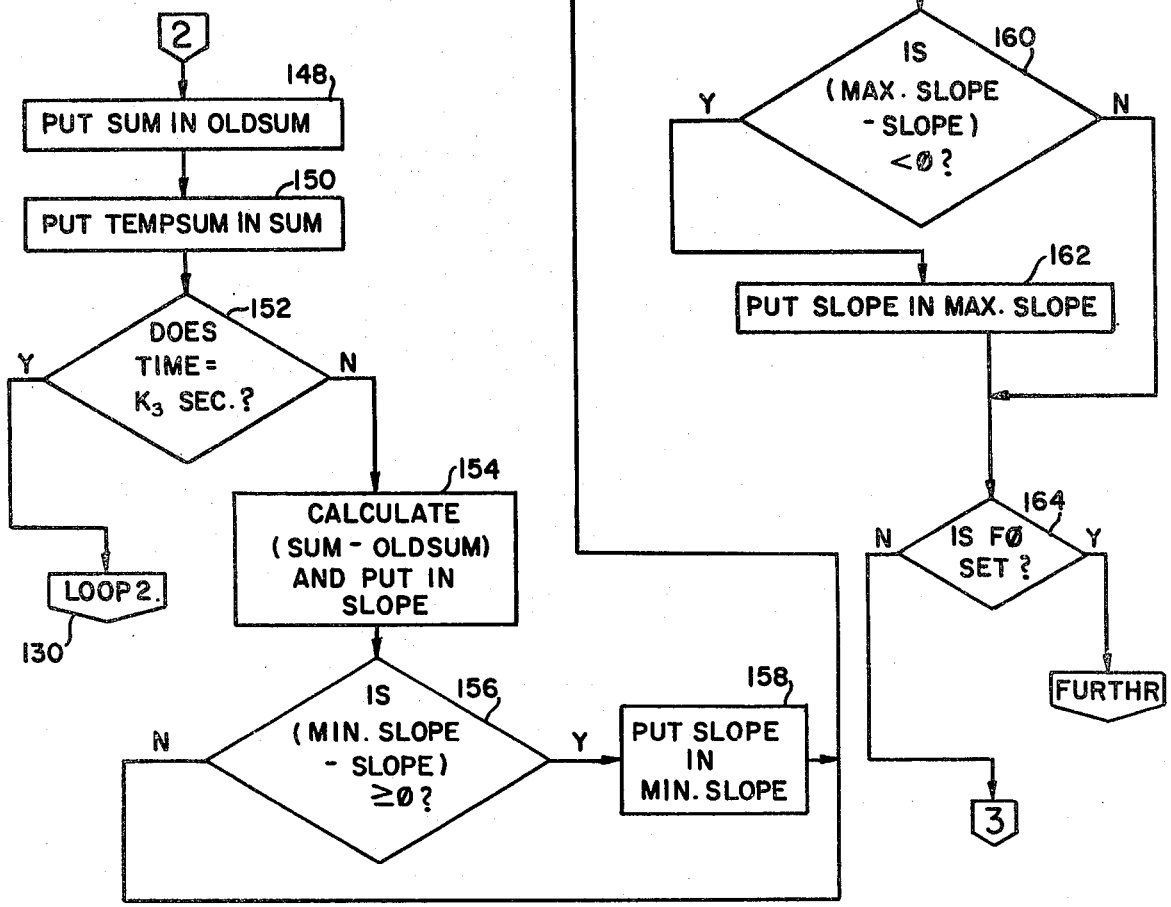
Figure 8:
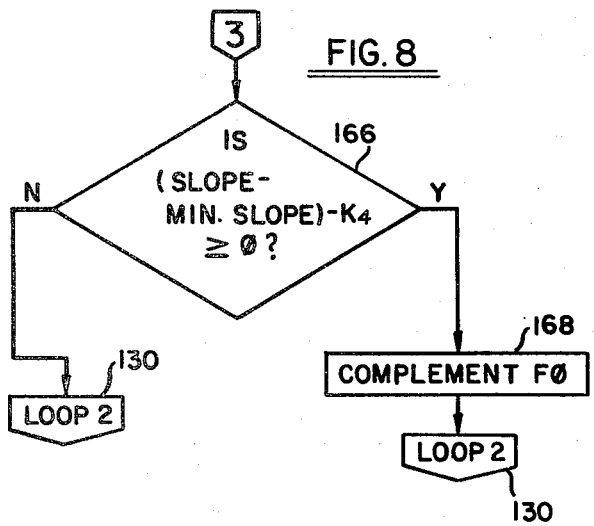

In FIG. 7, the program continues with step 148 which refers two additional register locations in the microcomputer. One is called "Sum" and the other is "Oldsum". In step 148, the contents of the register "Sum" are moved into the register location "Oldsum" and the previous contents of the register "Oldsum" are cancelled. In Block 150, the contents of the latest readings in "Tempsum" are transferrerd into the register location "Sum". The sequence then moves to block 152 where a test is made to see if the time is equal to $K_3$ seconds. If it is, the program returns through Loop 2, step 130. Thus, the first entry into the steps of FIG. 7 at $T=K_3$ simply sets a voltage reading in the "Sum" register which will later be transferred into "Oldsum". Calculation of a slope requires at least two points on the line and therefore the first calculation can only be done when the time equals 1 minute plus $K_3$ when the previous voltage value is present for comparison to the new value. Of course, this is really an approximation of the slope rather than an accurate determination.

Accordingly, if the time elapsed equals $K_3$ seconds. the sequence goes back to loop 2, block 130 and continues for another minute. Subsequently, when the time equals $K_3$ plus any integral number of minutes, the sequence goes on to block 154 where the difference in value between the "Sum" register and the "Oldsum" register is calculated and put into a register location called "Slope". The sequence then continues to block 156.

In step 156, the register "Min. Slope" which was set to an initial large value in step 124 is used. Specifically, the value in "Slope" is subtracted from the value in "Min. Slope" and the result tested to see if it is greater than or equal to 0. If the "Slope" register is less than the previous "Minimum Slope" register, which had been initialized to a very large number, the "Slope" value is put into the "Minimum Slope" register. Thus, once per minute, each time through this program sequence, a slope is calculated and a check is done to see if the new value of slope is less than the previous lowest slope reading. If it is, this new slope is put into the "Minimum Slope" register in block 158 and the sequence continues to block 160. If the newest slope is not less than the minimum slope, the sequence also goes to block 160.

Here, the slope reading just taken is subtracted from the "Max. Slope" register which was initialized at block 126 to a very small number. If this difference is less than 0, meaning that the new value in the "Slope" register is greater than the previous value in the "Max. Slope" register, then this slope value is put into the "Max. Slope" register and replaces the old contents. This is done in block 162.

Next, the sequence flows to block 164 where a test is done to see if the flag F∅, which was cleared in step 122, is set. Up to this time, it has not, so the sequence will proceed through connection point 3 to block 166. At block 166, a test is done to see if the latest slope value is greater than the minimum slope by a preselected increment, $K_4$. The value of $K_4$ is selected to define some minimum value of positive change which must occur, to avoid transient effects, before the system is allowed to recognize that the slope has stopped decreasing and is now increasing. In the case of nickel-cadmium batteries, $K_4$ may be 15 millivolts per minute per cell. Once this occurs, an inflection point will have been identified by approximation.

If the slope value has not increased over the "Minimum Slope" value by this necessary increment, the sequence returns to block 130 which is the loop 2 return. This means that the slope is either continuing to become less or if it is increasing, it has not increased sufficiently. If the latest slope is greater than "Min. Slope" by $K_4$, meaning that inflection point has been passed (or that the sign of the second derivative has changed), the sequence flows to block 168 where flag F∅ is complemented or set. This means, referring to FIG. 1, that the transition into Region III has been made and that the charge cycle is well along toward completion. From block 168 the sequence also continues back to block 130 to continue the process as previously described.

At this point, although it is not shown in the flow chart, it is usually preferable to replace the value in the "Max. Slope" register with the value in the "Slope" register. This insures that additional slope values after the first inflection point will be compared to the actual slope at the first inflection point and not to an earlier value which may have been carried because it was slightly larger that the inflection point value.

Figure 9:
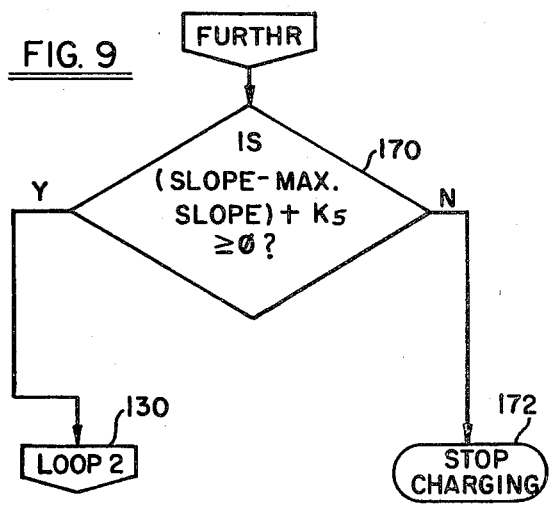

Eventually, the process will continue through sufficient cycles so that it will arrive again at step 164. Now, the response to this interrogation will be "yes" and the program will proceed through the connection point "FURTHR" into FIG. 9. There, the sequence continues to block 170 where the slope value is tested to see if it is less than the value in register "Max. Slope" by an increment $K_5$ which may be approximately the same in value as $K_4$. This is the test for the Region III-to-Region IV transition shown in FIG. 1. If the slope is less than "Max. Slope" by $K_5$, then the charge cycle has reached this second inflection point and the charge cycle is complete. The sequence then goes to block 172 and, the charging process is terminated in the same manner as described in regard to step 118. If, however, the latest slope is not less than the "Max. Slope" by a sufficient increment, then the sequence returns to block 130 and continues until one of the four charge method analyses described above causes the charging sequence to stop.

In this way, this flow of operations takes the apparatus through the methods of analysis described above, testing at appropriate time intervals for time analysis of excessive total time elapsed, for excessively high voltage on the cell or battery, indicating possible damage, for a drop in voltage from one period to another of sufficient magnitude indicating that the cell or battery is in Region V or for the sequence of second derivative tests indicating that the cell or battery has gone through the transition from Regions III to IV, as described in FIG. 1 in the change of sign of second derivative test.

VOLTAGE PROFILE ANALYSIS

The present invention, as thus far described, has been directed to the profile of voltage change with time which occurs in a battery when the charging system used is of the type generally known as a "constant current" charger. This type of voltage change is actually obtainable in several different ways. First, it may be obtained by applying a steady unchanging charging current to the battery and measuring the change of voltage with time. In this method, the charger power supply and current amplifier may be chosen to provide a predetermined current level at any battery voltage between zero and a value slightly in excess of the voltage of the battery at full charge. The current level is chosen on the basis of factors such as the charge efficiency, the cost of the power supply and amplifier, and the desired time to fully charge a totally discharged battery. In general, in nickel-cadmium batteries of the C size or sub-C size, the current applied is about three times the C-rate of the battery. The C-rate of a battery is a current in amperes which is numerically equal to its ampere-hour capacity. A "3C" current would bring a battery to full charge in about 20 minutes.

In other cases, charging rates such as C or 5C may be selected; these would fully charge a discharged battery in about one hour or in about 12 minutes, respectively.

A second method of obtaining the voltage profile of FIG. 1 is by applying the charging current in pulses and measuring the rest voltage of the battery when the current is zero. This is known as trough voltage sensing. In a sense, the voltage measurements are taken at a "constant" current level of zero amps. The profile of voltage with time will correspond in form, although not in scale, to that shown in FIG. 1 and exactly the same method of analysis as described above may be applied.

A third method of obtaining this same profile is to apply a current which may vary cyclically but which has a constant average value. If the measured voltage is averaged over a similar time period, thus compensating for the cyclic variations in current, the voltage profile obtained is exactly the same in form as that shown in FIG. 1, and again, the same method of analysis may be applied.

A fourth method of obtaining the same profile is to allow the current to vary but to measure the voltage only at the time when the current equals some preselected constant level; again, this produces the same results as the other methods just described.

In all of these instances, the voltage profile for a given battery will assume the same general form. Since the novel method of analysis described in this specification is a function only of the form of the profile and not of its actual value, this method may be applied to any of these charging techniques. For convenience, all of these methods are commonly referred to by the term "voltage profile".

APPLICATION OF VOLTAGE PROFILE ANALYSIS TO OTHER BATTERY COUPLES

Figure 10:
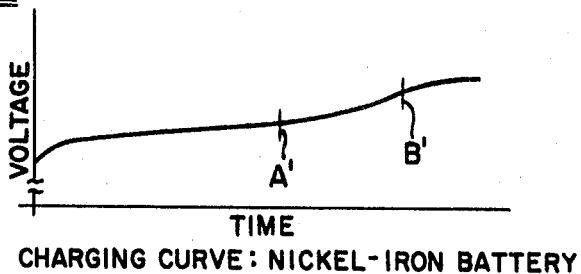
FIGS. 10–13 are graphs illustrating the variation of voltage as a function of time during the charge cycle of several different batteries.

FIGS. 10-13 illustrate a variety of voltage profiles for particular examples of several different types of batteries, all of which have been developed using the "constant current" method referred to above. Specifically, FIG. 10 is a representative profile obtained in the case of a nickel-iron battery. It will be noted that the general appearance of this curve is similar to that of FIG. 1 and in particular, similar inflection points occur at A' and B' as the battery approaches full charge. Thus, exactly the same technique can be applied to the nickel-iron battery as has been described for the nickel-cadmium. The only differences are that the constants must be selected in accordance with the needs of the particular battery, considering its internal construction and the level of current which it can accept, the number of cells and the corresponding maximum voltage; and the maximum time or maximum voltage which can be accepted without damage. Also, the small scale of the changes in the voltage profile require the system of voltage measurement to have a higher resolution than is true in the case of a nickel-cadmium battery. In principle, however, the method of charging is substantially identical.

Figure 11:
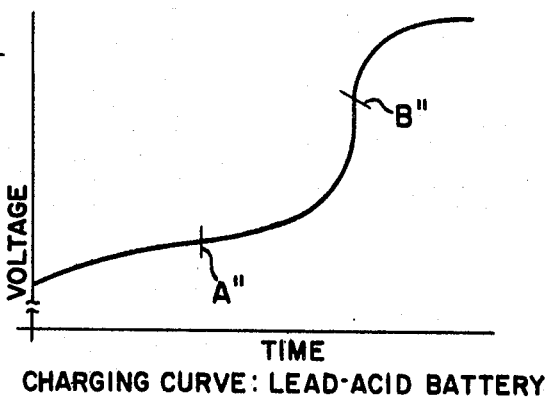

FIG. 11 illustrates the charging curve of a representative lead acid battery. Once again, it can be seen that the five Regions as described in connection with FIG. 1 are repeated in the case of the typical lead acid profile and similar inflection points A" and B" occur. The only differences are that the overall change of voltage is larger and the rate of change in Region III is greater. However, since the Regions are the same and the sequence of inflection points is the same, essentially the same method as described in connection with nickel-cadmium batteries and nickel iron batteries can again be used for lead acid batteries.

However, it has been found that full (100%) charging of a lead acid battery can be better obtained by the additional application of a surcharge after the second inflection point has been reached. This is due to the internal chemistry of the lead acid battery which causes the final addition of energy to occur at a slower rate than in the case of a nickel-cadmium battery. Therefore, the optimum charge method for lead acid batteries is to apply the inflection point method of analysis as previously described, and, when the second inflection point between Regions III and IV is identified, the microcomputer is instructed to shift the charging rate to an intermediate level. This intermediate rate is then applied for a fixed period of time.

In general, lead acid batteries have a structure which permit the constant current to be about C or 2C in the fast charge mode. The surcharge rate selected is generally about one-half of the full charge rate. The fixed period of time is calculated by determining how long it takes to add 25% of the full battery capacity to the battery at the surcharge rate. At the end of that time, the battery charger automatically terminates the full charge mode and begins a maintenance mode cycle which simply compensates for self-discharge.

Figure 12:
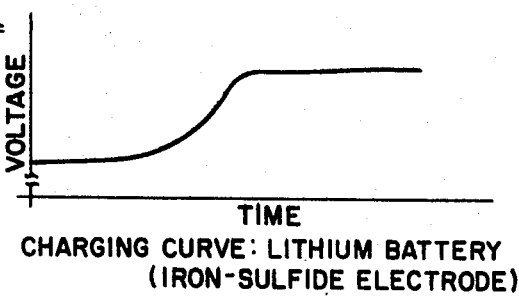

FIG. 12 illustrates the charging curve for a lithium battery having an iron sulfide electrode. In this case, the inflection points occur much earlier in the charge cycle and there are almost no distinguishing features of the voltage profile after the second inflection point. Because of this voltage profile, it would be extremely difficult to provide a reliable fast charger for such a battery using only prior art techniques. In accordance with the present invention, the inflection points can be determined very precisely. This indicates that the battery is approximately at 45% of capacity. Accordingly, a charging program for a lithium battery of this type may use the same system for determining inflection points as have been described above, coupled with a timing sequence. When a battery is attached to the charger, a timer is started and it is set to discontinue the full charge rate when enough time has passed to add approximately 55% of the total battery capacity to the battery. If no inflection points are encountered during this period, the timer alone shuts off the system at the end of the period. This accommodates a battery which may be placed on charge although it already has a reasonably full charge.

However, if the inflection points are encountered before the time has expired, then the timer is simply restarted. This ensures that a battery which was discharged, or only partially charged, initially will receive its full charge.

Figure 13:
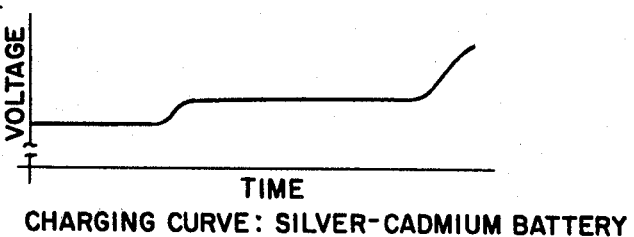

FIG. 13 illustrates still another variation of voltage profile, namely, that for a silver cadmium battery. In this instance, simple determination of two consecutive inflection points is not sufficient; addition of energy to a battery which is fully discharged should produce four consecutive inflection points before full charge is reached.

In order to fully charge this battery, another combination of the inflection point analysis method with the alternative charge termination modes previously described will fully charge this battery. Specifically, the charger is arranged to seek the four consecutive inflection points which indicate that the battery being charged has gone through its entire cycle from fully discharged to fully charged; if this occurs, the charger terminates the application of the fast rate charge current. However, this termination mode alone is not sufficient. In addition, the system is instructed to compare the total voltage to some preselected value after each inflection point is measured. If the voltage is above the preselected level when an inflection point is reached, it will then be known that the battery was not fully discharged when the charge program was started and that the battery is now fully charged. Accordingly, the application of the full rate current is discontinued. Thus, the system accommodates both batteries which are placed on charge while already either fully or partially charged and also batteries which are fully discharged; in both cases, the charger brings the battery precisely to its full charge capacity without the harmful effects of prior art charging techniques.

Of course, in devising the method and system for each of the batteries mentioned in connection with FIGS. 10-13, the additional safeguards to prevent serious overcharge and to shut the system off in the event that either the battery or the charger is defective are also included; thus, a maximum total time limit, a maximum voltage limit, a negative change in voltage, and a negative slope limit may all be included as appropriate.

CURRENT PROFILE ANALYSIS

The description of this invention as set forth above has been given in terms of the battery analysis method which applies when the state of charge of the battery is measured under "constant current" conditions. In addition, it is possible to charge the battery in a "constant voltage" mode, to measure the change in current with the passage of time, and to apply similar methods of inflection point analysis to the resultant profile of changing current with time. This technique involves the selection of a constant voltage to be applied to the battery by the charger; the voltage chosen is selected so that the current which it applies to the battery during the bulk of the charge time is reasonable on the basis of the same parameters as described in the case of the constant current charger, namely, the charger efficiency, the cost, and the time required to fully charge a discharged battery. Once again, this application of constant voltage produces a known and predictable form for the curve traced by the change in current with time.

Actually, the term "constant voltage" is applied equally to systems in which the actual applied voltage is constant throughout the charge period, to systems in which the current is always measured when the voltage is at a preselected value, or to systems in which a pulsating applied voltage has a constant average and in which the measured current is correspondingly averaged. All of these systems produce a curve of current against time which has the same general form and which may be treated by means of the same inflection point analysis; accordingly, this profile is referred to herein as the "current profile".

Figure 14:
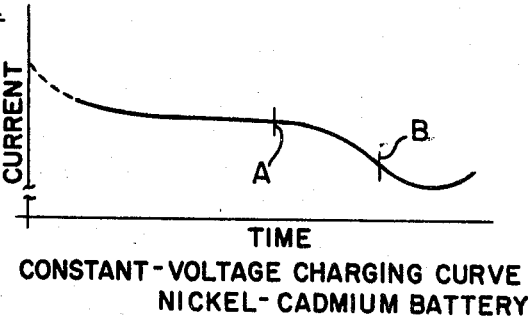
FIG. 14 is a graph illustrating the variation of current as a function of time during the charge cycle of a nickel-cadmium battery.

In the particular case of a nickel-cadmium battery, the current profile is illustrated in FIG. 14. In fact, this curve is exactly the same in form as that shown in FIG. 1 except that the entire curve is inverted. Thus, the method of inflection point analysis as applied to this profile is exactly the same as has been described in connection with FIG. 1 except that all of the pertinent analyses regarding signs, direction of change, etc. are reversed. Initially, the current decreases in a manner corresponding to that in Region I in which the voltage of FIG. 1 increased. This is followed by an interval in which the current decreases slowly; this is normally the longest time interval and the one in which the major increase occurs in the energy stored in the battery. This corresponds to the increasing voltage of Region II of FIG. 1.

The inflection point which must be identified between this interval and the next Region of sharply decreasing current occurs at the same point in time as point A in FIG. 1. However, it identifies a change in the sign of the second derivative of current from positive to negative whereas Point A in FIG. 1 identified a change in the sign of the second derivative of voltage from negative to positive. Similarly, the inflection point between Regions III and IV is now identified as that at which the second derivative changes from negative to positive whereas in FIG. 1, the change was from positive to negative.

Thus, the entire description of the method of inflection point analysis as applied in connection with FIGS. 1-9 can be converted to a method of inflection point analysis for the constant voltage case by changing the word "voltage" to "current" and by reversing all words such as "increasing", "decreasing", "positive", "negative", etc.

Similarly, with regard to FIGS. 10–13, the particular batteries identified there can be charged by the constant voltage technique. In each case, the general method of inflection point analysis as set forth in the specification exactly corresponds to that which has already been described.

RATE OF CHARGING

A primary benefit of the present invention is that any normal battery, that is, any battery which is not defective, can be charged at a relatively high rate. In using previously known battery charging methods, it has been necessary to limit the application of high rate charging currents to batteries which are especially adapted to accommodate the inadequate shut-off modes in use. This is due to the fact that previous methods cannot stop the fast charge current at the proper moment and the various harmful effects previously noted can occur. Only batteries designed to withstand these effects can be used and even such batteries experience shortened lives, etc.

In contrast, the method of the present invention provides such precise control over the application of energy to the battery that it can be used to fast charge even those batteries which were previously intended for charging only by slow rate methods.

The term "trickle charge" usually refers to a charge rate such that the battery receives its full charge only over a period of 12 to 24 hours. Thus, typical trickle chargers apply a current of between 0.05C and 0.1C. In accordance with previous methods, the terms "fast charge" or "quick charge" are generally applied to rates in excess of 0.2C; that is, charge rates which would charge a battery in less than 5 hours.

All batteries accept currents of the "fast charge" level for limited periods of time. The upper limit for a particular battery is governed by the current-acceptance capability of the battery; that is, of its internal and external connections, and of its internal plates, and also by its internal ion transit time. This level is generally given by the manufacturer. For example, sub-C size nickel-cadmium batteries available from General Electric can accept fast charge current at the 4C rate; lead acid batteries of the sealed type available from Gates Energy Products, Inc. can accept fast charge current at the 0.3C rate.

Even though batteries could accept such fast charge currents, presently known chargers are not capable of shutting off the fast charge current at the proper moment and even batteries which structurally could accept fast rate currents can only be charged at the trickle charge rate. In general, any charge rate above the 5 hour rate (0.2C) has previously required a special battery design.

Because of the accuracy with which the present invention determines the full charge level, the present charging method permits the use of fast charge currents with many batteries which could previously be charged only by slow, trickle charge rates. This is particularly true in the categories of nickel-cadmium batteries and lead acid batteries which predominate among the rechargeable battery couples presently available.

Thus, the present method permits essentially all of nickel-cadmium batteries presently in use by consumers to be recharged in a time on the order of 1 hour. Lead acid batteries of the gel type can be charged in a time on the order of 2 hours; those of the liquid type can be even more quickly charged.

In general terms, the present invention permits the application of a high rate; that is, a rte in excess of 0.2C and up to the rated current acceptance level of the battery; normal batteries so charged by the system of the present invention will receive a full charge and will not be damaged.

FINISH MODE

In the case of nickel-cadmium batteries, the inflection point analysis described above brings a battery to essentially 100% charge. Thus, when the second inflection point has been reached, the charger can shift into a maintenance mode in which short pulses of high rate charging current are applied periodically to compensate for self-discharge. For example, a 1C current may be applied for 15 seconds every 6 hours. Other maintenance cycles might be used if desired.

In actual practice, repetitive charging of the battery to exactly the second inflection point may cause minute reversible degradation because this point occurs a small fraction of a percentage point below 100% charge. This degradation may be reversed when the battery is left on maintenance or when the operator, occasionally, places the battery on charge even though it is not discharged. This drives the voltage slightly into Region V of FIG. 1 so that cut-off occurs in accordance with block 145 of FIG. 6 which reverses the degradation.

To completely prevent even the possibility of such degradation, a surcharge current of 0.1C can be applied for a few hours after the second inflection point has been reached. The above-described maintenance cycle may then begin.

In the case of lead acid batteries, as has previously been discussed, an interval of low rate charging may be useful to completely charge the battery; thereafter, an appropriate maintenance mode is used to compensate for self-discharge. In other battery couples, other finishing techniques may be utilized as appropriate.

SUMMARY

The foregoing specification describes a battery charging method which basically utilizes the inflection point analysis method to identify very precisely significant points in the variation of the electrochemical energy in a battery during its charge cycle. Accordingly, the appended claims are broadly directed to this method and are intended to include all variations of this method as may be obvious to those skilled in the art.

Among the many possible variations, it should be noted that the above apparatus particularly described has made use of an approximation technique for determining the occurrence of an inflection point. It is, of course, fully within the contemplation of this invention to use this or other approximation techniques for locating critical points in a profile, or to provide a circuit which is capable of directly monitoring the second derivative for a change in sign. Similar variations may also be used with regard to other parametric profiles.

Another set of variations comprises the particular battery characteristic selected for analysis. While the present description has been directed particularly to the voltage or current, profiles of other characteristics, particularly electrical characteristics might also be analyzed. It is noted that this profile may also vary with other battery conditions; in fact, as previously described, the analysis of this invention partially depends on the fact that other battery conditions affect the profile.

In addition to the extremely precise method of inflection point analysis as hereinbefore described, the present invention also encompasses the analysis for other critical points in the profile of variation with time of a characteristic of the battery which changes with the energy level stored in the battery. In addition, therefore, to inflection point analysis, the present invention is also in part directed to improvements in method and apparatus for charging batteries which relate to detailed analyses of the profile of battery characteristics, the analyses involving combinations of such factors as limiting value, slope, and passage of time. By analysing the profile of the particular characteristic for the battery under charge, particular combinations of these events may be identified and used by those familar with batteries and the art of battery charging to provide improved techniques of fast battery charging without departing from the spirit of the present invention.

In addition, the present invention presents numerous subcombinations of this method which have not previously been known; the many variations of these combinations which will readily occur to those familiar with the battery and battery charging art are also intended to be included.

Particular emphasis has also been placed on the charging of nickel-cadmium batteries and lead acid batteries in view of the importance of these couples. The specific methods perfected for charging such batteries are also fully within the contemplation of the present invention.

Finally, a specific apparatus has been disclosed for performing the method of this invention. A great many obvious variations of this apparatus will be readily apparent which correspond generally to the alternative methods described. It is fully intended that the apparatus claims in this application be extended to cover all such alternative embodiments of this basic apparatus.

We claim:

1. A method of rapidly and efficiently charging a battery of the type in which the voltage characteristic thereof varies with the state of charge of the battery and in which the voltage characteristic varies with time during charging to exhibit an inflection point prior to the battery attaining substantial full charge, the inflection point characterized by a change in the slope of the voltage characteristic from successive increases in slope to a decrease, the method comprising the steps of:

supplying electrical energy to the battery for charging thereof;

monitoring said voltage characteristic of the battery periodically during charging;

computing the slope of the variation of said monitored voltage characteristic with time;

storing the maximum value of the so-computed slope values;

comparing each successively computed slope value with said stored maximum value;

identifying the inflection point exhibited in the variation of said voltage characteristic prior to the battery attaining substantial full charge by identifying a change in the so-compared slope values from successive increases in slope to a decrease; and controlling the supply of electrical energy to the battery on the basis of the so-determined occurrence.

2. A method of rapidly and efficiently charging a battery of the type in which the current characteristic drawn by the battery during charging varies with the state of charge of the battery and in which the current characteristic varies with time during charging to exhibit an inflection point prior to the battery attaining substantial full charge, the inflection point characterized by a change in slope of the current characteristic from successive decreases in slope to an increase, the method comprising the steps of:

supplying electrical energy to the battery for charging thereof;
monitoring said current characteristic drawn by the battery periodically during charging;
computing the slope of the variation of said monitored current characteristic with time;
storing the minimum value of the so-computed slope values;
comparing each successively computed slope value with said stored minimum value;
identifying the inflection point exhibited in the variation of said current characteristic prior to the battery attaining substantial full charge by identifying a change in the so-compared slope values from successive decreases in slope to an increase; and
controlling the supply of electrical energy of the battery on the basis of the so-determined occurrence.

3. A method of rapidly and efficiently charging a battery of the type having a characteristic associated therewith that varies with the state of charge of the battery and in which the variation of the characteristic with time during charging exhibits an inflection point prior to the battery attaining substantial full charge and another inflection point that precedes the first-mentioned inflection point, each inflection point characterized by a change in sign of the second derivative of the variation of the characteristic with time, the method comprising the steps of:

supplying electrical energy to the battery for charging thereof;
monitoring said characteristic of the battery periodically during charging;
computing the slope of the variation of said monitored characteristic with time;
storing the maximum and minimum values of the so-computed slope values;
comparing each successively computed slope value with the so-stored maximum and minimum values;
identifying the first-mentioned inflection point exhibited in said characteristic prior to the battery attaining substantial full charge by identifying for each inflection point, from the so-compared slope values, a change in sign of the second derivative of the variation of said characteristic with time; and
controlling the supply of electrical energy to the battery on the basis of the so-determined occurrence.

4. A method of rapidly and efficiently charging a battery of the type having a characteristic associated therewith that varies with the state of charge of the battery and in which the variation of the characteristic with time during charging exhibits an opposed pair of inflection points prior to the battery attaining substantial full charge, each inflection point characterized by a change in sign of the second derivative of the variation of the characteristic with time, the method comprising the steps of:

supplying electrical energy to the battery for charging thereof;
monitoring said characteristic of the battery during charging;
computing the slope of the variation of said monitored characteristic with time;
storing the maximum and minimum values of the so-computed slope values;
comparing each successively computed slope value with the so-stored maximum and minimum values;
identifying the last inflection point of the opposed pair of inflection points exhibited in said characteristic prior to the battery attaining substantial full charge by identifying for each inflection point, from the so-compared slope values, a change in sign of the second derivative of the variation of said characteristic with time; and
controlling the supply of electrical energy to the battery on the basis of the so-determined occurrence.

5. A method of rapidly and efficiently charging a battery of the type having a characteristic associated therewith that varies with the state of charge of the battery and in which the variation of the characteristic with time during charging exhibits an inflection point prior to the battery reaching substantial full charge and another inflection point that preceeds the first-mentioned inflection point, each inflection point characterized by a change in sign of the second derivative of the variation of the characteristic with time, the method comprising the steps of:

supplying electrical energy to the battery for charging thereof;
monitoring said characteristic of the battery periodically during charging;
computing the slope of the variation of said monitored characteristic with time;
storing the maximum and minimum values of the so-computed slope values;
comparing each successively computed slope value with the so-stored maximum and minimum values;
identifying a sequence of the preceeding and first-mentioned inflection points exhibited in said characteristic prior to the battery attaining substantial full charge by identifying for each inflection point, from the so-compared slope values, a change in sign of the second derivative of the variation of said characteristic with time; and
controlling the supply of electrical energy to the battery on the basis of the so-determined sequential occurrence.

6. A method of rapidly and efficiently charging a battery of the type having a characteristic associated therewith that varies with the state of charge of the battery and in which the variation of the characteristic with time during charging exhibits a first and a succeeding inflection point prior to battery attaining substantial full charge, each inflection point characterized by a change in sign of the second derivative of the variation of the characteristic with time, the method comprising the steps of:

supplying electrical energy to the battery for charging thereof;
monitoring said characteristic of the battery periodically during charging;

computing the slope of the variation of said monitored characteristic with time;

storing the maximum and minimum values of the so-computed slope values;

comparing each successively computed slope value with the so-stored maximum and minimum values;

identifying a sequence of the first and succeeding inflection points exhibited in said characteristic prior to the battery attaining substantial full charge by identifying for each inflection point, from the so-compared slope values, a change in sign of the second derivative of the variation of said characteristic with time; and controlling the supply of electrical energy to the battery on the basis of the so-determined sequential occurrence.

7. A method of rapidly and efficiently charging a nickel-cadmium battery in which the voltage varies with the state of charge of the battery and in which the variation of the voltage with time during charging exhibits an inflection point prior to the battery attaining substantial full charge and another inflection point that precedes the first-mentioned inflection point, each inflection point characterized by a change in sign of the second derivative of the variation of the characteristic with time, the method comprising the steps of:

supplying electrical energy to the battery for charging thereof;

monitoring said voltage characteristic of the battery periodically during charging;

computing the slope of the variation of said monitored voltage characteristic with time;

storing the maximum and minimum values of the so-computed slope values;

comparing each successively computed slope value with the so-stored maximum and minimum values;

identifying the first-mentioned inflection point exhibited in said characteristic prior to the battery reaching substantial full charge by identifying, from the so-compared slope values, a change in sign of the second derivative of the variation of said characteristic with time; and controlling the supply of electrical energy to the battery on the basis of the so-determined occurrence.

8. The method claimed in claims 1, 2, 3, 4, 5, 6 or 7 wherein said supplying step further comprises:

supplying the electrical energy to the battery at a rate greater than 0.2 C.

9. The method claimed in claims 3, 4, 5, or 7 wherein said monitoring step further comprises:

monitoring an electrical characteristic of the battery.

10. The method claimed in claim 9 wherein the monitoring step further comprises:

measuring the battery voltage.

11. The method claimed in claim 9 wherein the monitoring step further comprises:

measuring the current drawn by the battery during charging.

12. The method claimed in claim 11, wherein the monitoring step further comprises:

measuring the current drawn by the battery during charging at a constant value of voltage.

13. The method claimed in claims 1, 2, 3, 4, 5, 6, or 7 wherein said controlling step further comprises:

discontinuing the supply of electrical energy to the battery.

14. The method claimed in claim 13 wherein said controlling step further comprises:

discontinuing the supply of electrical energy to the battery and subsequently supplying electrical energy to the battery for a selected time period on a recurring basis.

15. The method claimed in claims 1, 2, 3, 4, 5, 6, or 7 wherein said controlling step further comprises:

reducing the rate of supply of electrical energy to the battery to a predetermined rate to prevent self-discharge thereof.

16. The method claimed in claims 1, 2, 3, 4, 5, or 6 in which the battery is of the nickel-cadmium type.

17. An apparatus for charging a battery of the type having a voltage characteristic associated therewith that varies with the state of charge of the battery and in which the variation of the characteristic with time during charging exhibits an inflection point prior to the battery attaining substantial full charge, the inflection point characterized by a change in the slope of the voltage characteristic from successive increases in slope to a decrease, said apparatus comprising:

means for supplying electrical energy to the battery for charging thereof; and means connected to said supply means for monitoring said voltage characteristic during charging and computing the slope of the variation of said monitored voltage characteristic with time, for storing the maximum value of the so-computed slope values and comparing each successively computed slope value with said stored maximum value to identify the inflection point exhibited in the variation of the voltage characteristic prior to the battery attaining substantial full charge by identifying a change in the so-compared slope values from successive increases in slope to a decrease, and for controlling said supply means on the basis of the so-determined occurrence.

18. An apparatus for charging a battery of the type having a current characteristic associated therewith that varies with the state of charge of the battery and in which the variation of the current characteristic with time during charging exhibits an inflection point prior to the battery attaining substantial full charge, the inflection point characterized by a change in slope of the current characteristic from successive decreases to an increase, said apparatus comprising:

means for supplying electrical energy to the battery for charging thereof; and means connected to said supply means for monitoring said current characteristic during charging and computing the slope of the variation of said monitored current characteristic with time, for storing the minimum value of the so-computed slope values, and comparing each successively computed slope value with said stored minimum value to identify the inflection point exhibited in the variation of the current characteristic prior to the battery attaining substantial full charge by identifying a change in the so-compared slope values from successive decreases in slope to an increase, and for controlling said supply means on the basis of the so-determined occurrence.

19. An apparatus for charging a battery of the type having a characteristic associated therewith that varies with the state of charge of the battery and in which the variation of the characteristic with time during charging exhibits an inflection point prior to the battery attaining substantial full charge and another inflection point that precedes the first-mentioned inflection point, each inflection point characterized by a change in sign of the second derivative of the variation of the characteristic with time, said apparatus comprising:

means for supplying electrical energy to the battery for charging thereof; and means connected to said supply means for monitoring said characteristic periodically during charging and computing the slope of the variation of said monitored characteristic with time, for storing the maximum and minimum values of the so-computed slope values and comparing each successively computed slope value with the stored maximum and minimum values to identify the occurrence of the first-mentioned inflection point by identifying, from the so-compared slope values, a change in sign of the second derivative of the variation of the characteristic with time, and for controlling said supply means on the basis of the so-identified occurrence.

20. An apparatus for rapidly and efficiently charging a battery of the type having a characteristic associated therewith that varies with the state of charge of the battery and in which the variation of the characteristic with time during charging exhibits an opposed pair of inflection points prior to the battery attaining substantial full charge, each inflection point characterized by a change in sign of the second derivative of the variation of the characteristic with time, said apparatus comprising:

means for supplying electrical energy to the battery for charging thereof; and means connected to said supply means for monitoring said characteristic periodically during charging and computing the slope of the variation of said monitored characteristic with time, for storing the maximum and minimum values of the so-computed slope values and comparing each successively computed slope value with the so-stored maximum and minimum values to identify the occurrence of the last inflection point of said opposed pair by identifying, from the so-compared slope values, a change in sign of the second derivative of the variation of the characteristic with time, and for controlling said supply means on the basis of the so-identified occurrence.

21. An apparatus for rapidly and efficiently charging a battery of the type having a characteristic associated therewith that varies with the state of charge of the battery and in which the variation of the characteristic with time during charging exhibits an inflection point prior to the battery attaining substantial full charge and another inflection point that precedes the first-mentioned inflection point, each inflection point characterized by a change in sign of the second derivative of the variation of the characteristic with time, said apparatus comprising:

means for supplying electrical energy to the battery for charging thereof; and means connected to said supply means for monitoring said characteristic periodically during charging and computing the slope of the variation of said monitored characteristic with time, for storing the maximum and minimum values of the so-computed slope values and comparing each successively computed slope values with the stored maximum and minimum values to identify a sequence of said preceeding and first-mentioned inflection points by identifying, from the so-compared slope values, changes in sign of the second derivative of the variation of the characteristic with time, and for controlling said supply means on the basis of the so-identified occurrence.

22. An apparatus for rapidly and efficiently charging a battery of the type having a characteristic associated therewith that varies with the state of charge of the battery and in which the variation of the characteristic with time during charging exhibits a first and a succeeding inflection point prior to battery attaining substantial full charge, each inflection point characterized by a change in sign of the second derivative of the variation of the characteristic with time, said apparatus comprising:

means for supplying electrical energy to the battery for charging thereof; and means connected to said supply means for monitoring said characteristic at least periodically during charging and computing the slope of the variation of said monitored characteristic with time, for storing the maximum and minimum values of the so-computed slope values and comparing each successively computed slope value with the so-stored maximum and minimum values to identify a sequence of the first and succeeding inflection points by identifying, from the so-compared slope values, changes in the sign of the second derivative of the variation of the characteristic with time, and for controlling said supply means on the basis of the so-identified sequential occurrence.

23. An apparatus for charging a nickel-cadmium battery of the type having a voltage characteristic associated therewith that varies with the state of charge of the battery and in which the variation of the voltage characteristic with time during charging exhibits an inflection point prior to the battery attaining substantial full charge and another inflection point that precedes the first-mentioned inflection point, each inflection point characterized by a change in sign of the second derivative of the variation of the voltage characteristic with time, said apparatus comprising:

means for supplying electrical energy to the battery for charging thereof; and stored-program controlled means connected to said supply means for monitoring said voltage characteristic periodically during charging and computing the slope of the variation of said monitored voltage characteristic with time, for storing the maximum and minimum values of the so-computed slope values and comparing each successively computed slope value with the stored maximum and minimum values to identify the occurrence of the first-mentioned inflection point by identifying, from the so-compared slope values, a change in sign of the second derivative of the variation of the voltage characteristic with time, and for controlling said supply means on the basis of the so-identified occurrence.

24. The apparatus claimed in claims 17, 18, 19, 20, 21, or 22 wherein said second-mentioned means comprises: stored-program processor controlled means.

* * * * *